United States Patent
Zhao

(10) Patent No.: US 10,961,443 B2
(45) Date of Patent: *Mar. 30, 2021

(54) OIL FIELD CHEMICAL DELIVERY FLUIDS, METHODS FOR THEIR USE IN THE TARGETED DELIVERY OF OIL FIELD CHEMICALS TO SUBTERRANEAN HYDROCARBON RESERVOIRS AND METHODS FOR TRACING FLUID FLOW

(71) Applicant: JOHNSON MATTHEY PUBLIC LIMITED COMPANY, London (GB)

(72) Inventor: Chun-tian Zhao, Cleveland (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/569,421

(22) PCT Filed: Apr. 26, 2016

(86) PCT No.: PCT/GB2016/051173
§ 371 (c)(1),
(2) Date: Oct. 26, 2017

(87) PCT Pub. No.: WO2016/174414
PCT Pub. Date: Nov. 3, 2016

(65) Prior Publication Data
US 2018/0298274 A1   Oct. 18, 2018

(30) Foreign Application Priority Data
Apr. 30, 2015   (GB) ........................... 1507480

(51) Int. Cl.
*E21B 47/11*   (2012.01)
*C09K 8/80*   (2006.01)
(Continued)

(52) U.S. Cl.
CPC ............. *C09K 8/805* (2013.01); *C09K 8/50* (2013.01); *C09K 8/516* (2013.01); *C09K 8/52* (2013.01);
(Continued)

(58) Field of Classification Search
CPC .......... C09K 8/805; C09K 8/50; C09K 8/516; C09K 8/52; C09K 8/528; C09K 8/536;
(Continued)

(56) References Cited

U.S. PATENT DOCUMENTS 3,531,409 A * 9/1970 Seffens ............... C23F 11/149
507/203
4,670,166 A * 6/1987 McDougall ........... C09K 8/536
507/224
(Continued)

FOREIGN PATENT DOCUMENTS

WO   WO2012090158 A1   7/2012

OTHER PUBLICATIONS

PCT/GB2018/051173, International Search Report and Written Opinion, dated Aug. 31, 2016.
(Continued)

*Primary Examiner* — Angela M DiTrani Leff
(74) *Attorney, Agent, or Firm* — BakerHostetler

(57) ABSTRACT

Oil field chemical delivery fluids containing a mixture of a base fluid and microcapsules having an oil field chemical contained within the microcapsule are described. Chemical groups in the outer surface of the microcapsules interact with the base fluid and promote the dispersibility of the microcapsules in the base fluid. Chemical groups in the outer surface of the microcapsules interact with the targeted areas of a hydrocarbon reservoir and promote the substantivity of the microcapsules to the targeted areas of the reservoir. The oil field chemical delivery fluids provide for the placement
(Continued)

of microcapsules in a desired location within the well and/or reservoirs using properties such as the density of the microcapsules. Methods of making oil field chemical delivery fluids, systems containing oil field chemical delivery fluids, methods of fracturing rock in a reservoir and tracing the movement of fluid in a hydrocarbon reservoir using these fluids are described.

11 Claims, 2 Drawing Sheets

(51) Int. Cl.
| | |
|---|---|
| *C09K 8/536* | (2006.01) |
| *C09K 8/50* | (2006.01) |
| *C09K 8/58* | (2006.01) |
| *C09K 8/516* | (2006.01) |
| *C09K 8/92* | (2006.01) |
| *C09K 8/52* | (2006.01) |
| *C09K 8/528* | (2006.01) |
| *C09K 8/54* | (2006.01) |
| *C09K 8/588* | (2006.01) |
| *C09K 8/70* | (2006.01) |
| *C09K 8/74* | (2006.01) |

(52) U.S. Cl.
CPC .............. *C09K 8/528* (2013.01); *C09K 8/536* (2013.01); *C09K 8/54* (2013.01); *C09K 8/58* (2013.01); *C09K 8/588* (2013.01); *C09K 8/70* (2013.01); *C09K 8/74* (2013.01); *C09K 8/92* (2013.01); *E21B 47/11* (2020.05); *C09K 2208/20* (2013.01); *C09K 2208/22* (2013.01); *C09K 2208/32* (2013.01)

(58) Field of Classification Search
CPC . C09K 8/54; C09K 8/588; C09K 8/70; C09K 8/74; C09K 8/92; C09K 2208/20; C09K 2208/22; C09K 2208/32; E21B 47/11
See application file for complete search history.

(56) References Cited

U.S. PATENT DOCUMENTS

| | | | | |
|---|---|---|---|---|
| 4,986,354 | A * | 1/1991 | Cantu | C09K 8/516 166/279 |
| 5,073,276 | A * | 12/1991 | Newlove | C09K 8/82 507/224 |
| 5,164,099 | A * | 11/1992 | Gupta | C09K 8/62 166/300 |
| 5,892,147 | A | 4/1999 | Garnes et al. | |
| 5,922,652 | A | 7/1999 | Kowalski et al. | |
| 6,279,656 | B1 * | 8/2001 | Sinclair | C09K 8/516 166/304 |
| 6,326,335 | B1 * | 12/2001 | Kowalski | C09K 8/536 507/241 |
| 6,380,136 | B1 | 4/2002 | Bates et al. | |
| 6,659,175 | B2 | 12/2003 | Malone et al. | |
| 7,347,260 | B2 | 3/2008 | Ferguson et al. | |
| 8,393,395 | B2 | 3/2013 | Cochet et al. | |
| 8,640,773 | B2 | 2/2014 | Hewitt et al. | |
| 2006/0223713 | A1 | 10/2006 | Pakulski et al. | |
| 2009/0325823 | A1 | 12/2009 | Pakulski et al. | |
| 2010/0307745 | A1 * | 12/2010 | Lafitte | C09K 8/62 166/250.12 |
| 2012/0015852 | A1 * | 1/2012 | Quintero | C09K 8/32 507/112 |
| 2013/0017610 | A1 * | 1/2013 | Roberts | C09K 11/06 436/27 |
| 2013/0126164 | A1 * | 5/2013 | Sweatman | E21B 21/003 166/282 |
| 2014/0083704 | A1 | 3/2014 | Sangermano et al. | |
| 2014/0262529 | A1 * | 9/2014 | Quintero | C09K 8/528 175/69 |
| 2016/0186044 | A1 * | 6/2016 | Rothrock | C09K 8/58 166/300 |
| 2017/0349821 | A1 * | 12/2017 | Wei | E21B 37/06 |

OTHER PUBLICATIONS

GB 1607258.9, Combined Search and Examination Report under Sections 17 and 18(3), dated Nov. 25, 2016.

* cited by examiner

Figure 1. Representations of Particle Structures
Figure 1A. Core-Shell
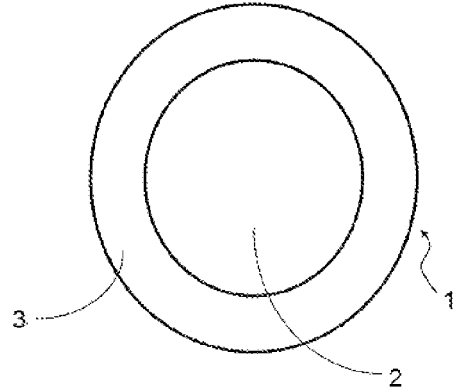
Figure 1B. Core Multi-Shell
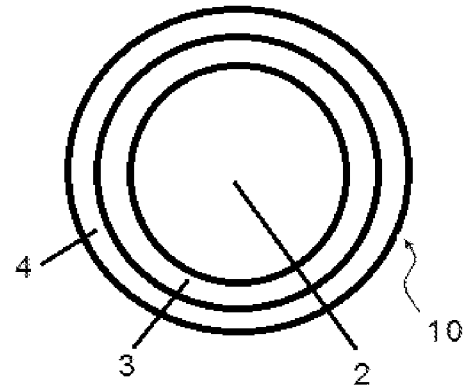
Figure 1C. Multi-Core-Shell
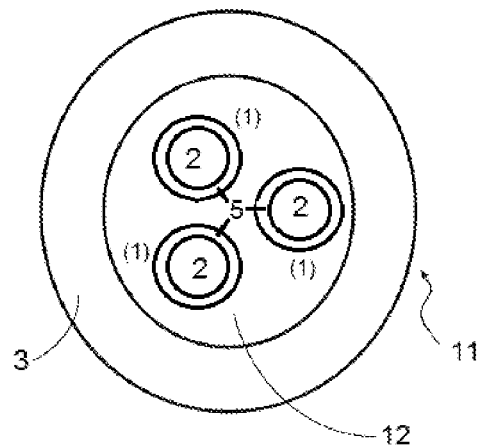
Figure 1D. Micro-Matrix
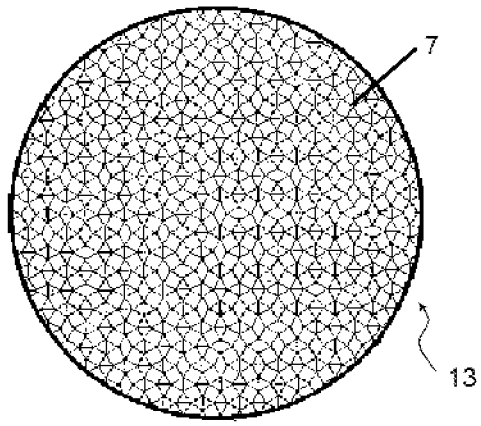
Figure 1E. Micro-Matrix with Shell
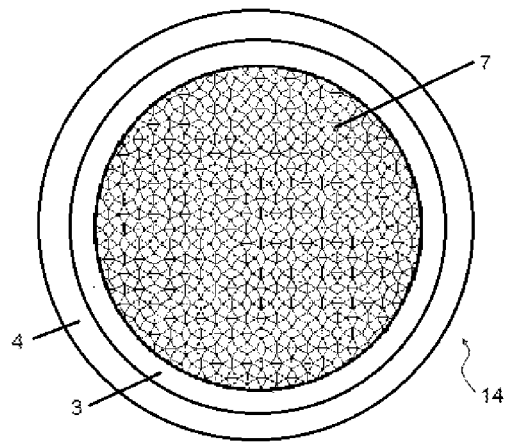
Figure 1F. Multicore-micro-matrix-shell
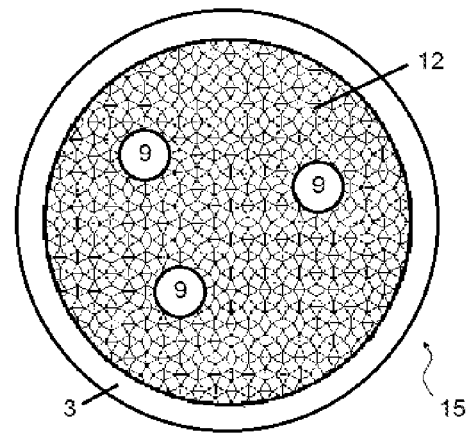

OIL FIELD CHEMICAL DELIVERY FLUIDS, METHODS FOR THEIR USE IN THE TARGETED DELIVERY OF OIL FIELD CHEMICALS TO SUBTERRANEAN HYDROCARBON RESERVOIRS AND METHODS FOR TRACING FLUID FLOW

CROSS-REFERENCE TO RELATED APPLICATIONS

This application is the National Stage of International Patent Application No. PCT/GB2016/051173 filed Apr. 26, 2016, which claims priority from Great Britain Patent Application No. 1507480.0 filed Apr. 30, 2015, the disclosures of each of which are incorporated herein by reference in their entireties for any and all purposes.

FIELD OF THE INVENTION

The present invention is directed towards oil field chemical delivery fluids comprising microcapsules containing one or more oil field chemicals within the microcapsules and methods of using these fluids in delivering oil field chemicals, such as tracers and biocides, to targeted areas within a hydrocarbon reservoir.

BACKGROUND OF THE INVENTION

It is common practice to deliver chemicals to a subterranean environment during various oilfield operations. Drilling fluids are used to aid in the drilling of boreholes and creating a well. Cleaning fluid and cement are normally used in the completion of the wells. Many operations during the lifetime of a well, whether it is a production well or an injection well, involve the use of oil field chemicals as well.

The first type of well operations using oil field chemicals is aimed at maximising the production of hydrocarbons. One such important well treatment is known as well stimulation, where an interventive operation is performed on an oil or gas well to increase production by improving the flow of hydrocarbons from the formations into the well bore. For example, in both carbonate and sandstone formation reservoirs, acid based fluids are often used to clean up, remove or bypass formation damage in the near well bore areas, or acidify formation matrix and increase the formation's natural permeability. Matrix acidification is performed at below formation fracturing pressure. Acid treatment can also be carried out at above formation fracturing pressure, i.e., acid fracturing.

A very common type of well stimulation currently used is non-acid hydraulic fracturing, where a non-acid fracking fluid under high pressure is injected into the wellbore and into perforation tunnels within the reservoir to cause the rock formation to fracture. Hydraulic fracturing is commonly applied to wells for access to shale gas, tight gas, tight oil, and coal seam gas. Conventional fracking fluid is often a thickened fluid. A thickener which increases the viscosity of the fracturing fluid can be a polysaccharide. Guar gum, often cross-linked with borate or a zirconium compound, is frequently used. Another category of thickeners which is used is viscoelastic surfactants. More recently, the so called "slick water" is used for hydraulic fracturing. Slick water fluids are basically fresh water or brine having a sufficient amount of a friction reducing agent to minimize the tubular friction pressures. Other components of the slick water can include low levels of surfactants, scale inhibitors and biocides. Such fluids generally have viscosities only slightly higher than that of unadulterated fresh water or brine. Granular proppants are often carried by fracking fluid into the fracture.

Another important well treatment used to maximise production of hydrocarbon is flooding of the reservoir for oil recovery. An oil well normally goes through three production stages: primary recovery, secondary recovery and tertiary recovery or enhanced oil recovery. Secondary and tertiary recovery are sometimes referred to as improved oil recovery. Techniques used in secondary recovery include water injection, natural gas reinjection and gas lift, which injects air, carbon dioxide or some other gas into the bottom of an active well, reducing the overall density of fluid in the wellbore. Water used in secondary recovery is often water produced from the same well or brine water. Low concentration of a viscosifier, such as an anionic polyacrylamide, is occasionally used. Technology used for enhanced oil recovery includes gas injection, thermal injection, and chemical injection. Gas injection uses gases such as natural gas, nitrogen, or carbon dioxide, while thermal injection introduces heat. In chemical injection, various chemicals, such as a water soluble polymer, an alkaline compound and surfactants, usually as dilute solutions, are used to aid mobility of hydrocarbons. In polymer flooding, a dilute solution of a water soluble polymer, e.g. a polyacrylamide, is used to increase the viscosity of the injected water and drive the oil out of the formations. This leads to the additional recovery of oil. Injection of alkaline or caustic solutions into reservoirs with oil that has organic acids naturally occurring in the oil will result in the production of a soap like material that can lower the interfacial tension enough to increase production. Dilute solutions of surfactants can be injected to lower the interfacial tension or capillary pressure that impedes oil droplets from moving through a reservoir. Different chemicals can also be used in combination to achieve maximum recovery rate.

In secondary type well operations, chemicals are delivered into the reservoir to provide protection to downhole pipeline and equipment and to facilitate hydrocarbon production. One major problem encountered in hydrocarbon production is flow assurance. Oilfield fluids (e.g., oil, gas, and water) are complex mixtures of aliphatic hydrocarbons, aromatics, hetero-atomic molecules, anionic and cationic salts, acids, sands, silts, clays and a vast array of other components. The nature of these fluids, combined with the severe conditions of heat, pressure, and turbulence to which they are often subjected during retrieval, are factors contributing to paraffin deposition (including the precipitation of wax crystals), emulsification (both water-in-oil and oil-in-water), gas hydrate formation, corrosion and asphaltene precipitation in oil and/or gas production wells and surface equipment. This, in turn, decreases permeability of the subterranean formation, reduces well productivity and shortens the lifetime of production equipment. In order to remove these unwanted deposits and precipitates from wells and equipment, it is necessary to stop production from the reservoir, which is both time-consuming and costly. Another major problem encountered in gas/oil field is the corrosion of downhole pipeline and equipment such as packers, screens and fluid loss devices, due to contact of the pipeline and equipment with water based fluid containing metal and acid species and in some cases oxygen. In order to protect the equipment, prolong the life of the well and assure the flow of hydrocarbons, chemicals including scale inhibitor, hydrate inhibitor, corrosion inhibitors, biocides, and wax and asphaltene control substances are needed to be delivered downhole to subterranean well and reservoirs.

Another example of oil field chemicals used in facilitating hydrocarbon production is tracers, which provide tools for monitoring the movement of fluids in hydrocarbon reservoirs. Optimal oil production from a reservoir depends upon reliable knowledge of the properties and characteristics of the reservoir. Traditional methods for reservoir monitoring include seismic log interpretation, well pressure testing, production fluid analysis, production history matching and interwell tracer techniques. The use of tracers to obtain information about a hydrocarbon reservoir and/or about what is taking place therein has been practiced for several decades and has been described in numerous documents. Tracers have primarily been used to monitor fluid paths and velocities. More than one tracer substance can be used concurrently. For instance, U.S. Pat. No. 5,892,147 discloses a procedure in which different tracer substances are placed at respective locations along the length of a well penetrating a reservoir. The tracer substances are placed at these locations during completion of the well before production begins. The tracer at each location is either attached to a section of pipe before it is placed at that location or is delivered into the location while perforating casing at that location. When production begins, monitoring the proportions of the individual tracers in the oil or gas produced by the well permits calculation of the proportions of oil or gas being produced from different zones of the reservoir.

Tracers can also be used for estimating residual oil saturation. Tracers have been used in single well tests and in interwell tests. In single well tests, one or more tracers are injected into the formation from a well and then produced out the same well mixed with fluids from the well. The difference in time between when a tracer that does not react with the formation (a conservative tracer) returns to the ground and a tracer that does react with a formation (a partitioning tracer) returns to the ground will give an indication of residual oil saturation, a piece of information that is difficult to acquire by other means. In interwell tests, the tracer is injected at one well along with a carrier fluid, such as water in a water flooding, and detected at a producing well after some period of time, which ranges from days to years. Radioactive and chemical tracers have been used extensively in the oil industry and hydrology testing for decades. Non-radioactive chemical tracers offer distinct advantages over the use of radioactive tracers. For example, there are more unique chemical tracers than radioactive tracers and no downhole logging tools are required.

Two or more different oil field chemicals can be used in combination. For example, a biocide is usually used along with a viscosifier or friction reducer in a hydraulic fracturing fluid. In many of the treatments and operations, tracers are used in conjunction with treatment chemicals. It is well known that tracers are often used in connection with hydraulic fracturing to provide information on the location and orientation of the fracture and the subsequent flow of reservoir fluids. Tracers are also used in conjunction with acid stimulating fluid and water or chemical flooding fluid for improving oil recovery. Due to the complexity of reservoirs, all information available is valuable in order to give the operator the best possible knowledge about the dynamics in the reservoir. One example is the monitoring of water production in improving oil recovery. A common secondary oil recovery process is water injection into dedicated injection wells. The water can travel in different layers and sweep different areas in the reservoir. Monitoring the production of this water in different zones in the well is important to design a production program that improves the sweep efficiency and thereby providing increased oil recovery. Mixing of injection water and formation water originally present in the reservoir can result in supersaturated solutions that can lead to precipitation of particles (scale) in either the reservoir near-well zone or in the production tubing. By using a tracer to determine which zones contribute to water production, action can be taken to reduce the effect of scaling and thereby maintain productivity.

A key for the oil field chemicals to work effectively and for the well treatment or operation to be successful, is for the oil field chemicals to be delivered to required areas of the oil well and reservoir as precisely as possible. Failure to deliver the oil field chemicals to the required areas in the reservoir can result in disrupted production, damage to equipment and environmental, health and safety concerns.

For oil field chemicals to enter the required areas of a hydrocarbon reservoir, the oil field chemicals need to be in a formulated composition. Liquid formulations can be injected downhole. It is normal practice that oil field chemicals used for well treatment are formulated into a form of fluid that is injected downhole to the reservoir. Methods are also known for absorbing particles of oil field chemicals into the pores of porous carrier particles or placing the oilfield chemical within a carrier material, where the particles or encapsulated material is suspended in the fluid and then pumped downhole.

It has been a challenge to deliver the required oil field chemicals to targeted areas of the well and reservoir. One issue is that many of the oil field chemicals are difficult to formulate. It is well known that many oil field chemicals are reactive and/or incompatible with the carrier liquid or other components of the formulation. The chemicals cannot stably remain inside the formulation before and after injection. For example, while water soluble tracers are easily dissolved in water based fracking fluid, oil soluble tracer can be difficult to incorporate into the same fluid. Successful use of additives to aid the incorporation of oil soluble tracers is limited. Additives can change the properties of fracking fluid to a degree that the fracking fluid is deemed not suitable for their purposed use.

There can be further issues related to the formulation that can affect the efficient delivery and release of the oil field chemicals. The formulation carrying the oil field chemicals need to travel and reach the required areas of the reservoir where the oil field chemicals are released from the formulation into targeted parts of reservoir where they can become adsorbed into/onto various components in those parts of the reservoir. The release of the oil field chemicals is often not controlled, i.e. the oil field chemicals cannot be released effectively from the formulation into targeted areas of oil well or reservoir, and the release of the oil field chemicals from the formulation and the targeted areas of the hydrocarbon reservoir often does not occur at the desired time.

SUMMARY OF THE INVENTION

The present invention has been made in view of the above mentioned issues in the delivery and release of oil field chemicals. This invention provides a means to compatibly formulate oil field chemicals in a chemically immiscible fluid. Oil soluble tracers or oil/water partitioning tracers can be formulated in water based fluids, i.e., water, acid based stimulation fluid, water based hydraulic fracking fluid, water based chemical flooding fluid, etc. Biocides and other well treatment agents can be formulated in the water based fluids mentioned above. An advantage of the methods and processes of the present invention is that oil field chemicals can be formulated in a way that, after injection, they are directed to targeted areas of a hydrocarbon reservoir, i.e., the delivery of the oil field chemical is targeted. The invention also provides for the targeted delivery of oil soluble tracers to oil rich formations of a reservoir. It is another advantage that the delivered oil field chemicals are released from the carrying formulations to the targeted area of a reservoir in a controlled way. As a result of being able to deliver tracers to defined formations of a reservoir in a targeted way where the tracers become released in controlled way, methods of monitoring and detecting fluid flow within and from the reservoir are provided in this invention.

Oil field chemicals to be delivered into hydrocarbon reservoirs are microencapsulated into microcapsules having a defined structure and surface composition that can interact with the base fluid and with components in targeted portions of the hydrocarbon reservoir. Microcapsules comprising the oil field chemicals are formulated with a base fluid to obtain an oil field chemical delivery fluid. The oil field chemical delivery fluid is injected downhole to a hydrocarbon reservoir through a well penetrating the reservoir. The defined surface composition of the microcapsules allows the microcapsules to be directed to targeted areas of the hydrocarbon reservoir. The oil field chemicals are released in a controlled manner.

In a first aspect of the invention, an oil field chemical delivery fluid comprises a base fluid and microcapsules having an outer surface, where the microcapsules comprise a microencapsulant and an oil field chemical contained within the microcapsules, where the outer surface of the microcapsules comprises one or more chemical groups that interact with the base fluid and promote the dispersibility of the microcapsules in the base fluid.

In another aspect of the invention, an oil field chemical delivery fluid comprises a base fluid and microcapsules having an outer surface, where the microcapsules comprise a microencapsulant and an oil field chemical contained within the microcapsules, where the outer surface of the microcapsules comprises one or more chemical groups that interact with the targeted area of a hydrocarbon reservoir and promote the substantivity of the microcapsules to the targeted area of the reservoir.

In still another aspect of the invention, the microcapsules described above can all have the same bulk density, which can be equal to, greater than or less than the apparent density of the base fluid used to make the oil field chemical delivery fluid described above.

In yet another aspect of the invention, the microcapsules described above have different bulk densities which can be equal to, greater than, or less than the apparent density of the base fluid used to make the oil field chemical delivery fluid described above.

In another aspect of the invention, a method of making an oil field chemical delivery fluid of the first aspect of the invention comprises blending a plurality of microcapsules, where each microcapsule comprises a microencapsulant and an oil field chemical contained within the microcapsule, with a base fluid.

In yet another aspect of the invention, a hydrocarbon reservoir and well treatment system comprises an oil field chemical delivery fluid of the first aspect of the invention, where the microcapsules comprise at least one well treatment agent.

In still another aspect of the invention, a hydrocarbon reservoir monitoring system comprises an oil field chemical delivery fluid of the first aspect of the invention, where the microcapsules comprise at least one tracer, and a means of obtaining a sample of a fluid from a hydrocarbon reservoir.

In yet still another aspect of the invention, a hydrocarbon reservoir comprises an oil field chemical delivery fluid of the first aspect of the invention.

In a further aspect of the invention, a method of tracing a flow of fluid from a hydrocarbon reservoir comprises the step of injecting within a well penetrating a reservoir the oil field chemical delivery fluid of the first aspect of the invention, where the oil field chemical comprises a tracer.

In yet another aspect of the invention, a method of tracing a flow of fluid from a hydrocarbon reservoir penetrated by an injection well comprises the steps of: (a) separating the reservoir penetrated by the well into a plurality of stages, (b) injecting within each stage an oil field chemical delivery fluid of the first aspect of the invention, where the oil field chemical comprises a tracer and the tracers comprised in the microcapsules in the oil field chemical delivery fluid for each stage are different from each other, (c) collecting a plurality of samples of fluids flowing from the well over a period of time; and (d) analyzing a sample of a fluid from the well to determine at least one of (i) the presence or absence of a tracer and (ii) the concentration of the tracer in fluids flowing from the well.

In still another aspect of the invention, a method of tracing a flow of fluid from a hydrocarbon reservoir penetrated by a well comprise: (a) separating the reservoir penetrated by the well into a plurality of stages, (b) injecting within each stage an oil field chemical delivery fluid of the first aspect of the invention, where the oil field chemical comprises two or more tracers and the tracers comprised in the microcapsules in the oil field chemical delivery fluid for each stage are different from each other, (c) collecting a plurality of samples of fluids flowing from the well over a period of time; (d) analysing a sample of a fluid from the well to determine at least one of (i) the presence or absence of a tracer and (ii) the concentration of the tracer in fluids flowing from the well.

BRIEF DESCRIPTION OF THE DRAWINGS

The invention can be understood from the following detailed description when read in connection with the accompanying drawings.

FIGS. 1A-1F are representations of the structures of different configurations of microcapsules.

DETAILED DESCRIPTION OF THE INVENTION

Figure 2:
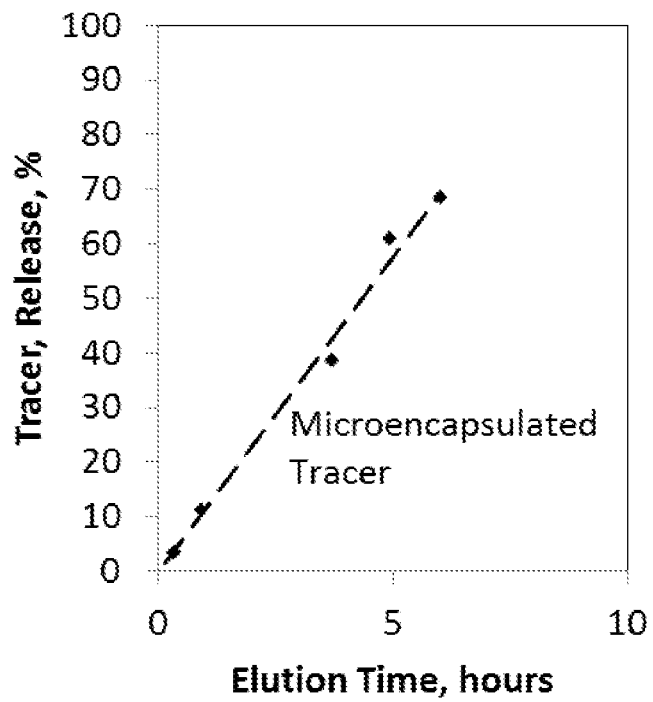
FIG. 2 is a graphical representation of the movement of a pure tracer and the release of a tracer from microcapsules into a synthetic oil.

Oil field chemical delivery fluids comprising microcapsules having the structures, surficial groups and bulk densities described herein provide a means for formulating, targeted delivery and controlled release of oil field chemicals, including tracers, biocides and/or other well treatment agents to areas of hydrocarbon reservoirs where treatment is needed and/or reservoir fluid is generated or passes by.

The following definitions are provided in order to aid those skilled in the art in understanding the detailed description of the present invention.

As used in this specification and the appended claims, the singular forms "a", "an" and "the" include plural referents unless the context clearly indicates otherwise. Thus, for example, reference to "a microcapsule" includes a mixture of two or more microcapsules, unless specifically stated otherwise.

As used herein, the term "about" means approximately and refers to a range that is optionally ±25%, preferably ±10%, more preferably, ±5%, or most preferably ±1% of the value with which the term is associated.

When a range, or ranges, for various numerical elements are provided, the range, or ranges, can include the values, unless otherwise specified.

The term "release" means a process where one or more compounds are introduced to a subterranean hydrocarbon (oil or gas) reservoir or well in the form of a composition or an article and the one or more compounds move from the composition or article into one or more fluids in the reservoir. The term "release", when used in the context of laboratory testing, refers to the movement of one or more compounds from a composition or article into an eluent that is representative of a fluid in the reservoir.

"Controlled release" means a release which progresses in a defined and predictable way. As used herein, "controlled release" refers particularly against time a kinetically zero order or near-zero order release over a period of time in given conditions. For example, for the release of oil soluble tracer, at a given temperature, in presence of oil (crude oil, synthetic oil, or eluents with properties similar to oil, e.g. organic solvents) after initial period (in less than 1 hour), the release rate is independent or near-independent of time.

The term "oil field chemical" means one or more chemical compounds or mixtures that can be released into a subterranean hydrocarbon (oil or gas) reservoir or well. The term "oil field chemical" includes tracers and well treatment agents.

The term "tracer" means one or more compounds that can be used to trace the movement of a material in a hydrocarbon reservoir, or to detect the composition or to measure the properties of specified areas of a hydrocarbon reservoir. The term "radioactive tracer" means a tracer which is radioactive. The term "chemical tracer" means a non-radioactive chemical compound that is used as a tracer.

The term "well treatment agent" refers to any of the various compounds or mixtures placed within a well or hydrocarbon reservoir to address various undesired effects caused by a variety of conditions including, but not limited to scale formation, salt formation, paraffin deposition, emulsification (both water-in-oil and oil-in-water), gas hydrate formation, corrosion, asphaltene precipitation, and paraffin formation. Well treatment agents include, but are not limited to, scale inhibitors, hydrate and halite inhibitors, corrosion inhibitors, biocides, wax and asphaltene control substances, demulsifiers, gel breakers, drag reducers, salt inhibitors, gas hydrate inhibitors, oxygen scavengers, foaming agents, surfactants and well clean up substances (such as enzymes; organic molecules, acids, esters, and aliphatic compounds).

The term "proppant" refers to particles that hold fractures open after a hydraulic fracturing treatment. Proppants can include sand, ceramics and other materials known in the art. The term "fracking fluid" refers to a fluid used in the hydraulic fracturing of rocks during oil/gas well formation. Fracking fluids contain water, proppants and a variety of well treatment agents or oil field chemicals.

The term "oil field chemical delivery fluid" refers to a liquid which carries an oil field chemical to be delivered to a well penetrated hydrocarbon reservoir, to complete a well treatment or intervention operation; to assist in completing a well treatment or intervention operation; or to provide assistance to long term operation of the well. The oil field chemical delivery fluid provided by this invention comprises a microcapsule which comprises a releasable oil field chemical compound.

The term "carrier fluid" refers to a fluid which is used to transport materials into or out of a wellbore.

The term "base fluid" refers to a fluid mixed with the microcapsules comprising oil field chemicals and used in formulating the oil field chemical delivery fluid. A base fluid used in the process of this invention can be a simple liquid without any oil field chemicals, or can be a well treatment fluid itself.

The term "well treatment fluid" refers to a fluid designed and prepared to resolve a specific wellbore or reservoir condition. A well treatment fluid usually contains at least one well treatment agent.

The term "acid based well stimulation fluid" refers to a well treatment fluid comprising an acid or a chemical that is converted into an acid in a hydrocarbon reservoir and is used for well stimulation.

The term "hydraulic fracturing fluid" refers to a well treatment fluid used for hydraulic fracturing within a well.

The term "chemical flooding fluid used for improved oil recovery" refers to a water based fluid used in secondary recovery or a well treatment fluid comprising chemicals such as polymers, alkaline, surfactants used for enhanced oil recovery.

The term "scale inhibition fluid" refers to a well treatment fluid used to inhibit formation of scales in a well.

The term "corrosion inhibition fluid" refers to a well treatment fluid used to inhibit corrosion of downhole tube and equipment in a well.

The term "wax control fluid" refers to a well treatment fluid used for inhibiting deposition of paraffin wax along downhole tubes and pipes.

The term "gas hydrate control fluid" refers to a well treatment fluid used to inhibit formation of hydrocarbon clathrate in a hydrocarbon reservoir environment.

The term "antimicrobial fluid" refers to a well treatment fluid containing biocides used to kill or inhibit the growth of bacteria in a hydrocarbon reservoir.

The term "hydrogen sulfide scavenger fluid" refers to a well treatment fluid used to scavenge hydrogen sulfide in a hydrocarbon reservoir.

The term "oxygen scavenger fluid" refers to a well treatment fluid used to scavenge oxygen in a hydrocarbon reservoir.

The term "produced water" refers to water that is produced as a by-product along with the oil or gas from a hydrocarbon reservoir.

The term "microcapsule" refers to a structure having an oil field chemical contained within the microcapsule by a microencapsulant. A microcapsule has either (a) a core comprising an oil field chemical with a shell around the core or (b) a micro-matrix comprising an oil field chemical with or without a shell.

The term "core" refers to the central inner portion of a composition. The core can be a simple phase of oil field chemicals, or a mixture comprising one or more oil field chemicals and non-polymeric materials. The core can contain a mixture of a plurality of sub-cores and non-polymeric materials. This configuration a plurality of sub-cores is referred to as a "multicore." Each of the sub-cores comprise one or more oil field chemicals. Each of the sub-cores can be surrounded by a polymeric shell.

The term "micro-matrix" refers to a three dimensional structure on micro-scale, i.e., with a size from nanometer to sub-millimeter. The three dimensional structure is made of polymers and contains one or more oil field chemicals distributed within the structure. A micro-matrix can be regarded as a special type of core. It differs from normal cores that it has a 3-dimensional polymeric structure. The polymers can be pre-formed or formed in-situ by polymerization of monomers. The micro-matrix can have oil field chemicals molecularly distributed in the entire micro-matrix structure or comprise a plurality of sub-cores, each containing an oil field chemical.

"Microencapsulant" refers to all materials, either polymeric or non-polymeric, within a microcapsule excluding oil field chemicals within the microcapsule and excluding non-polymeric materials within cores or multi-cores. Microencapsulants form a three-dimensional structure in the form of shells or micro-matrixes that contain the cores, sub-cores, multi-cores or oil field chemicals that are molecularly dispersed in the microencapsulant.

The term "shell" refers to a polymeric coating that at least partially surrounds a core, a micro-matrix or an adjacent shell between the shell and a core or micro-matrix.

The term "microcapsule" refers to a structure having an oil field chemical contained by a microencapsulant. A microcapsule has either (a) a core comprising an oil field chemical with a shell around the core or (b) a micro-matrix comprising an oil field chemical with or without a shell.

The term "emulsifier" refers to chemicals that are present in small amounts in a system that facilitate the formation of a dispersion (e.g., an emulsion, suspension). Emulsifiers are normally surfactants.

The term "stabilizers" refers to substances that are added to a dispersion system, such as an emulsion, to prevent or retard a change in the system. Many stabilizers are polymeric compounds and some stabilizers are charged. Some compounds can function as both emulsifiers and stabilizers.

The term "dispersiblity" refers to the property that particles comprising microcapsules can be mixed in and distributed into a carrier liquid, and "dispersible" means that these particles can be mixed in and distributed in a carrier fluid as individual particles.

The term "substantivity" refers to the property where particles deposit or accumulate at or on a defined surface of solid or liquid, and "substantive" means the tendency for particles to be deposited to a defined surface of solid or liquid.

The term "nanoparticle" refers to particles generally having at least one dimension of ≤400 nm.

The term "reservoir fluid" refers to fluids in an oil or gas reservoir.

The term "drilling fluid" refers to fluids introduced during the process of drilling a well.

The term "formation fluid" refers to naturally occurring liquids and gases contained in geologic formations.

The term "production fluid" refers to a fluid produced from a well that is not a treatment fluid. Production fluid is usually a mixture of oil, gas and water that flows from the wellhead of an oil well from a reservoir during production process.

The term "catalyst" refers to one or more compounds that catalyse the reaction of monomers and/or an intermediate compound to form a polymer.

"Wt %" refers to the weight of a component or ingredient relative to the total dry weight of a composition, e.g., weight percent. For example, a dosage form comprising 40 wt % of compound (1) that weighs 1000 mg contains 400 mg of compound (1).

The term "cumulative % of the applied tracer (or oil field chemical) released" refers to the total percentage of the initial amount of a tracer (or oil field chemical) that was released from a composition over a specific period of time under specific test conditions.

Oil Field Chemicals

In each of the compositions described herein, at least one oil field chemical is present within the core or micromatrix of the microcapsule particles. The preferred oil field chemical is a tracer, a corrosion inhibitor or a biocide. More than one oil field chemical can be incorporated into the core or micro-matrix of the composition. When one or more oil field chemicals are incorporated into the core or micro-matrix of the composition, the one or more oil field chemicals can be mixed together or can be present in the core or micro-matrix in discrete structures, such as in a multi-core structure. When the core or micro-matrix contains two or more oil field chemicals, all of the oil field chemicals can be oil soluble oil field chemicals, water soluble oil field chemicals, a mixture of water soluble and oil soluble oil field chemicals or they can be simultaneously co-soluble water and oil co-soluble. The oil field chemicals in a core or micro-matrix can be released to the liquid or gas phase of a hydrocarbon reservoir, or into both the gas phase and liquid phase of the hydrocarbon reservoir. One or more oil field chemicals can also be present in one or more shells surrounding the core. When two or more oil field chemicals are present in the composition, all of the oil field chemicals can be oil soluble oil field chemicals, all of the oil field chemicals can be water soluble oil field chemicals, or the oil field chemicals can be a mixture of oil soluble oil field chemicals and water soluble oil field chemicals. When two or more oil field chemicals are present in the composition, at least one of the oil field chemicals is located within a core or micro-matrix.

The oil field chemicals are not chemically reactive or bound to any other components of the composition.

The oil field chemicals can be solids, liquids or gases at the temperature of which the chemicals are to be released. One of the advantages of the use of the compositions and articles described herein, is that gaseous, liquid and/or solid oil field chemicals, including tracers and well treatment agents, can be incorporated into the compositions or articles described herein, and then delivered to the targeted hydrocarbon reservoir or well, where they are slowly released into fluids in the reservoir or well.

Tracers

Any chemical compound can be used as tracer with the present invention if it can be detected within one or more fluids within a reservoir and does not interfere or interact undesirably with other materials present in the oil well at the levels used. Preferably, before the tracer is added to the well, the tracer is not present at a measurable level in reservoir fluids from the well to be tested. This means that background levels of the tracer should be less than the limit of detection. It is also preferred that the tracer can be measured at levels sufficiently low to allow its use to be economical. While upper limits for the concentration of the tracer in reservoir fluid can be as high as about 10,000 parts per million, for a variety of reasons, such as economical, toxicological, causing unacceptable interactions with other materials present in an oil well, etc. the tracers can be detectable at a range of from about 1 parts per quadrillion to about 500 parts per million in the fluid being analyzed. Preferably the tracers are detectable at a range of from 1 part per trillion to about 50 parts per million. More preferably the tracers are detectable at a range of from 5 parts per trillion to about 10 parts per million. Preferably the tracer is not a radioactive tracer.

In one aspect of the present invention, more than one tracer can be used to measure multiple operations in the same well. For example, oil wells often have more than one producing strata or zone. In the practice of the present invention, a fracture could be done on one stratum using a first tracer and a fracture could be done on another stratum using a second tracer. Horizontal drilling allows for the drilling of multiple bores terminating in a common bore which connects to the surface. In multilateral wells such as these, several different tracers could be used to keep track of concurrent recovery of materials from the several legs (lateral bores) of such wells.

The tracers can be present in the compositions in an amount from about 0.5% to about 80% by weight of the total composition, preferably from about 2% to about 65% by weight of the total composition, more preferably from about 5% to about 50% by weight of the total composition. The amount of tracer present in the compositions can be based upon the elution profile and the expected concentration in the reservoir fluid into which the tracer will move when eluted from the compositions. Concentrations of the tracer in the eluent can be at least about 1 part per quadrillion and preferably at a concentration of less than or equal to 10,000 parts per million. Preferably the concentration of the tracer in the eluent is from about 100 parts per trillion to about 100 parts per million.

Oil Soluble Tracers

Tracers used to track the movement of oil soluble materials generally have low water solubility and high (>1000) organic/water partition coefficients. Several families of such compounds have been used. Illustrative examples of suitable tracer compounds of the present invention are organic compounds selected from the hydrocarbons and halogenated hydrocarbons. Mixtures of these compounds can also be used although single compounds are preferred. The tracer compound can preferably be a halogenated aromatic, polycyclic aromatic, heterocyclic aromatic, aromatic ketone, cycloalkane, or aliphatic compound, where the compound including at least one halogen selected from the group consisting of Br, Cl, F and I. Suitable tracers include, but are not limited to 4-iodotoluene, 1,4-dibromobenzene, 1-chloro-4-iodobenzene, 5-iodo-m-xylene, 4-iodo-o-xylene, 3,5-dibromotoluene, 1,4-diiodobenzene, 1,2-diiodobenzene, 2,4-dibromomesitylene, 2,4,6-tribromotoluene, 1-iodonaphtalene, 2-iodobiphenyl, 9-bromophenanthrene, 2-bromonaphthalene, bromocyclohexane, 1,2-dichlorobenzene, 1,3-dichlorobenzene, 1,4-dichlorobenzene, 1-bromododecane, bromooctane, 1-bromo-4-chlorobenzene, bromobenzene, 1,2,3-trichlorobenzene, 4-chlorobenzylchloride, 1-bromo-4-fluorobenzene, perfluoromethylcyclopentane (PMCP), perfluoromethylcyclohexane (PMCH), perfluorodimethylcyclobutane (PDMCB), m-perfluorodimethylcyclohexane (m-PDMCH), o-perfluorodimethylcyclohexane (o-PDMCH), p-Perfluorodimethylcyclohexane (p-PDMCH), perfluorotrimethylcyclohexane (PTMCH), perfluoroethylcyclohexane (PECH), and perfluoroisopropylcyclohexane (IPPCH).

Water Soluble Tracers

Water soluble tracers can be used to trace the movement of production fluids containing water. Groups of compounds that are commonly described in the art as dyes, pigments, and colorants can be used. These compounds are often visible to the eye in either ambient or ultraviolet light. Suitable tracers useful with the present invention include but are not limited to those selected from the group consisting of: Acridine Orange; 2-anthracenesulfonic acid, sodium salt; Anthrasol Green IBA (Solubilized Vat Dye); bathophenanthrolinedisulfonic acid disodium salt; amino 2,5-benzene disulfonic acid; 2-(4-aminophenyl)-6-methylbenzothiazole; Brilliant Acid Yellow 8G (Lissamine Yellow FF, Acid Yellow 7); Celestine Blue; cresyl violet acetate; dibenzofuransulfonic acid, 1-isomer; dibenzofuransulfonic acid, 2-isomer; 1-ethylquinaldinium iodide; fluorescein; fluorescein, sodium salt (Acid Yellow 73, Uranine), Keyfluor White ST (Flu. Bright. 28); Keyfluor White CN; Leucophor BSB (Leucophor AP, Flu. Bright. 230); Leucophor BMB (Leucophor U, Flu. Bright. 290); Lucigenin (bis-N-methylacridinium nitrate); mono-, di-, or tri-sulfonated naphthalenes, including but not limited to:—1,5-naphthalenedisulfonic acid, disodium salt (hydrate) (1,5-NDSA hydrate); 2-amino-1-naphthalenesulfonic acid; 5-amino-2-naphthalenesulfonic acid; 4-amino-3-hydroxy-1-naphthalenesulfonic acid; 6-amino-4-hydroxy-2-naphthalenesulfonic acid; 7-amino-1,3-naphthalenedisulfonic acid, potassium salt; 4-amino-5-hydroxy-2,7-naphthalenedisulfonic acid; 5-dimethylamino-1-naphthalenesulfonic acid; 1-amino-4-naphthalene sulfonic acid; 1-amino-7-naphthalene sulfonic acid; and 2,6-naphthalenedicarboxylic acid, dipotassium salt; 3,4,9,10-perylenetetracarboxylic acid; Phorwite CL (Flu. Bright. 191); Phorwite BKL (Flu. Bright. 200); Phorwite BHC 766; Pylaklor White S-15A; 1,3,6,8-pyrenetetrasulfonic acid, tetrasodium salt; pyranine, (8-hydroxy-1,3,6-pyrenetrisulfonic acid, trisodium salt); quinoline; Rhodalux; Rhodamine WT; Safranine O; Sandoz CW (Flu. Bright, 235); Sandoz CD (Flu. Bright. 220); Sandoz TH-40; Sulforhodamine B (Acid Red 52); Tinopal 5BM-GX; Tinopol DCS; Tinopal CBS-X; Tinopal RBS 200; Titan Yellow (Thiazole Yellow G), and any existing ammonium, potassium and sodium salts thereof. Preferred fluorescent tracers are 1,3,6,8-pyrenetetrasulfonic acid, tetrasodium salt and 1,5-naphthalenedisulfonic acid, disodium salt (hydrate).

Preferably the chemical tracers useful with the present invention include, but are not limited to: halogenated benzoic acids, salts and compounds derived from the acid such that they hydrolyze to form the acids, or salts thereof, in the reservoir, including 2-fluorobenzoic acid; 3-fluorobenzoic acid; 4-fluorobenzoic acid; 3,5-difluorobenzoic acid; 3,4-difluorobenzoic acid; 2,6-difluorobenzoic acid; 2,5-difluorobenzoic acid; 2,3-difluorobenzoic acid; 2,4-difluorobenzoic acid; pentafluorobenzoic acid; 2,3,4,5-tetrafluorobenzoic acid; 4-(trifluoro-methyl)benzoic acid; 2-(trifluoromethyl)benzoic acid; 3-(trifluoro-methyl)benzoic acid; 3,4,5-trifluorobenzoic acid; 2,4,5-trifluorobenzoic acid; 2,3,4-trifluorobenzoic acid; 2,3,5-trifluorobenzoic acid; 2,3,6-trifluorobenzoic acid; 2,4,6-trifluorobenzoic acid and the brominated, chlorinated and iodinated analogs thereof. When more than one halogen atom is present on the benzoic acid, the halogens can be the same or different. Preferably, the salts of the halogenated benzoic acids are sodium salts or potassium salts.

Well Treating Agents

Numerous types of well treating agents are known in the art. Well treating agents are used to inhibit, control, prevent or treat various conditions that can affect the reservoir and the production of oil and/or gas from the reservoir. Well treating agents are generally described in families based on what function they perform, such as scale inhibitors, asphaltene dispersants and inhibitors, acid stimulation chemicals, sand control agents, napthenate and other carboxylate anti-fouling agents, corrosion control agents, gas hydrate control agents, wax (paraffin wax) control agents, demulsifiers, foam control agents, flocculants, biocides, hydrogen sulfide scavengers, oxygen scavengers, drag-reducing agents (DRA's), hydrotesting chemicals and foamers for gas well deliquification. In many cases, it would be helpful if well treating agents were able to be slowly released over time to help maintain the well treating agent at an effective concentration in the well or reservoir. Various types of well treating agents are described by Malcolm A. Kelland in Production Chemicals for the Oil and Gas Industry, Second Edition Hardcover, 16 Apr. 2014.

Biocides include oxidising biocides; nonoxidizing organic biocides, such as aldehydes, quaternary phosphonium compounds, quaternary ammonium compounds, cationic polymers, organic bromides, metronidazole, isothiazolones (or isothiazolinones) and thiones, organic thiocyanates, phenolics, alkylamines, diamines and triamines, dithiocarbamates, 2-decylthioleethanamine and hydrochloride salts, triazine derivatives, and oxazolidines; and biostats (control "biocides" or metabolic inhibitors), such as anthraquinone, nitrates and nitrites. Specific examples of biocides include acrolein, bronopol, 2,2-dibromo-3-nitrilopropionamide, formaldehyde, glutaraldehyde, tetrakishydroxymethyl phosphonium sulfate (THPS), $[NR_1R_2R_3R_4]^+Cl^-$ (where $R_1$=alkyl($C_{14}$-$C_{18}$) and $R_2$, $R_3$, and $R_4$=methyl or benzyl or $R_1$ and $R_2$=alkyl($C_{10}$) and $R_3$ and $R_4$=methyl), dibromonitrilopropioanamide (DBNPA), Dazomet (MITC), tributyl tetradecyl phosphonium chloride (TTPC), halogenated oxidizers, dithiocarbamate, methylene bisthiocyanate (MBT), didecylmethylquat, methylbenzylcocuat, cocodiamine diacetate, cocodiamine, and chlorine dioxide.

Scale inhibitors include polyphosphonates, phosphate esters, nonpolymeric phosphonates and aminophosphonates, polyphosphonates, phosphino polymers and polyphosphinates, polycarboxylates, biodegradable polycarboxylates and polysulfonates. Exemplary anionic scale inhibitors include strong acidic materials such as a phosphonic acid, a phosphoric acid or a phosphorous acid, phosphate esters, phosphonate/phosphonic acids, the various aminopoly carboxylic acids, chelating agents, and polymeric inhibitors and salts thereof. Included are organo phosphonates, organo phosphates and phosphate esters as well as the corresponding acids and salts thereof. Phosphonate/phosphonic acid type scale inhibitors are often preferred in light of their effectiveness to control scales at relatively low concentration. Polymeric scale inhibitors, such as polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS), are also effective scale inhibitors. Sodium salts are preferred.

Asphaltene dispersants and inhibitors include low molecular weight, nonpolymeric asphaltene dispersants, such as low-polarity nonpolymeric aromatic amphiphiles, sulfonic acid-base nonpolymeric surfactant asphaltene dispersants, nonpolymeric surfactant asphaltene dispersants with acidic head groups, amide and imide nonpolymeric surfactant asphaltene dispersants, and alkylphenols and related asphaltene dispersants; and oligomeric (resinous) and polymeric asphaltene dispersants, such as alkylphenol-aldehyde resin oligomers, polyester and polyamide/imide asphaltene dispersants and asphaltene dissolvers. Exemplary asphaltene treating chemicals include, but are not limited to, fatty ester homopolymers and copolymers (such as fatty esters of acrylic and methacrylic acid polymers and copolymers) and sorbitan monooleate.

Acid stimulation chemicals include corrosion inhibitors for acidizing, nitrogen based corrosion inhibitors, oxygen-containing corrosion inhibitors, including those with unsaturated linkages, corrosion inhibitors containing sulphur, ion control agents, water wetting agents, oil-wetting agents, weak organic acids, weak sandstone-acidizing fluorinated agents, buffered acids, gelled or viscous acids, foamed acids, temperature-sensitive acid-generating chemicals and enzymes and emulsified acids.

Sand control agents include resins and organosilanes.

Anti-fouling agents include napthenate and other carboxylate anti-fouling agents.

Corrosion control agents include film-forming corrosion inhibitors (FFCI's) such as phosphate esters, amine salts of polycarboxylic acids, quaternary ammonium and iminium salts and zwitterionics, amidoimines and imidazolines, amides, polyhydroxy and ethoxylated amines/amides, nitrogen containing heterocycles, sulfur containing compounds and polyamino acids. Exemplary corrosion inhibitors include, but are not limited to, fatty imidazolines, alkyl pyridines, alkyl pyridine quaternaries, fatty amine quaternaries and phosphate salts of fatty imidazolines.

Gas hydrate control agents include thermodynamic hydrate inhibitors (THI's); kinetic hydrate inhibitors (KHI's), such as vinyl lactam KHI polymers, hyperbranched polyester amide KHI's, pyroglutamate KHI polymers and polydialkylmethacrylamide KHI's; anti-agglomerates (AA's), such as emulsion pipeline AA's, hydrate-philic pipeline AA's, natural surfactants and nonplugging oils, gas well AA's and gas hydrate plug removal agents. Exemplary gas hydrate control agents include, but are not limited to, polymers and homopolymers and copolymers of vinyl pyrrolidone, vinyl caprolactam and amine based hydrate inhibitors such as those disclosed in U.S. Patent Publication Nos. 2006/0223713 and 2009/0325823, both of which are herein incorporated by reference.

Wax (paraffin wax) control agents include wax solvents, thermochemical wax control packages, chemical wax prevention agents, such as wax inhibitors, ethylene polymers and copolymers, comb polymers (methacrylic ester polymers and maleic copolymers), wax dispersants and polar crude fraction flow improvers. Exemplary paraffin inhibitors useful for the practice of the present invention include, but are not limited to, ethylene/vinyl acetate copolymers, acrylates (such as polyacrylate esters and methacrylate esters of fatty alcohols), and olefin/maleic esters.

Demulsifiers include polyalkoxylate block copolymers and ester derivatives, alkylphenol-aldehyde resin alkoxylates, polyalkoxylates of polyols or glycidyl ethers, polyamine polyalkoxylates and related cationic polymers, polyurethanes (carbamates) and polyalkoxylate derivatives, hyperbranched polymers, vinyl polymers, polysilicones, dual-purpose demulsifiers and biodegradable demulsifiers. Exemplary demulsifying agents include, but are not limited to, condensation polymers of alkylene oxides and glycols, such as ethylene oxide and propylene oxide condensation polymers of di-propylene glycol as well as trimethylol propane; and alkyl substituted phenol formaldehyde resins, bis-phenyl diepoxides, and esters and diesters of such di-functional products. Preferred non-ionic demulsifiers are oxyalkylated phenol formaldehyde resins, oxyalkylated amines and polyamines, di-epoxidized oxyalkylated polyethers, etc. Suitable oil-in-water demulsifiers include poly triethanolamine methyl chloride quaternary, melamine acid colloid, aminomethylated polyacrylamide, etc.

Foam control agents include defoamers and antifoams, such as silicones and fluorosilicones, and polyglycols. Exemplary foaming agents include, but are not limited to, oxyalkylated sulfates or ethoxylated alcohol sulfates, or mixtures thereof.

Flocculants include cationic polymers such as dialkyldimethylammonium chloride polymers, acrylamide or acrylate-based cationic polymers; environmentally-friendly cationic polymeric flocculants; dithiocarbamates; anionic polymers and amphoteric polymers.

Hydrogen sulfide scavengers include nonregenerative $H_2S$ scavengers, such as solid scavengers, oxidising chemicals, aldehydes, reaction products of aldehydes and amines, such as triazines, and metal carboxylates and chelates.

Oxygen scavengers include dithionite salts, hydrazine and guanidine salts, hydroxylamines and oximes, activated aldehydes and polyhydroxyl compounds, catalytic hydrogenation agents, enzymes, sulfided iron reagents, bisulfite, metabisulfite and sulphate salts. Exemplary oxygen scavengers include triazines, maleimides, formaldehydes, amines, carboxamides, alkylcarboxyl-azo compounds cumine-peroxide compounds morpholino and amino derivatives morpholine and piperazine derivatives, amine oxides, alkanolamines, aliphatic and aromatic polyamines.

Drag-reducing agents (DRA's) include oil-soluble DRA's, such as polyalkene (polyolefin) DRA's and polymethacrylate ester DRA's, and water-soluble DRA's, such as polysaccharides and derivatives, polyethylene oxide DRA's, acrylamide-based DRA's and water-soluble surfactant DRA's. Exemplary surfactants include cationic, amphoteric, anionic and nonionic surfactants. Cationic surfactants include those containing a quaternary ammonium moiety (such as a linear quaternary amine, a benzyl quaternary amine or a quaternary ammonium halide), a quaternary sulfonium moiety or a quaternary phosphonium moiety or mixtures thereof. Suitable surfactants containing a quaternary group include quaternary ammonium halide or quaternary amine, such as quaternary ammonium chloride or a quaternary ammonium bromide. Amphoteric surfactants include glycinates, amphoacetates, propionates, betaines and mixtures thereof. The cationic or amphoteric surfactant can have a hydrophobic tail (which can be saturated or unsaturated) such as a $C_{12}$-$C_{18}$ carbon chain length. Further, the hydrophobic tail can be obtained from a natural oil from plants such as one or more of coconut oil, rapeseed oil and palm oil. Preferred surfactants include N,N,N-trimethyl-1-octadecammonium chloride: N,N,N-trimethyl-1-hexadecammonium chloride; and N,N,N-trimethyl-1-soyaammonium chloride, and mixtures thereof. Suitable anionic surfactants are sulfonates (like sodium xylene sulfonate and sodium naphthalene sulfonate), phosphonates, ethoxysulfates and mixtures thereof.

Hydrotesting chemicals include biocides, oxygen scavengers, corrosion inhibitors, dyes and environmentally friendly agents.

Foamers for gas well deliquification can also be used.

Base Fluid

A base fluid is the fluid mixed with microcapsules to form the oil field chemical delivery fluid of this invention. The base fluid can be water or an oil based liquid. The water based fluid can be deionized water, sea water, brine water or produced water. The base fluid can also be a well treatment fluid on its own. Examples of well treatment fluid that can also be a base fluid are acid based well stimulation fluid, hydraulic fracturing fluid, chemical flooding fluid used for improved oil recovery, scale inhibition fluid, corrosion inhibition fluid, wax control fluid, gas hydrate control fluid, antimicrobial fluid, hydrogen sulfide scavenger fluid, and oxygen scavenger fluid. A particular important example is hydraulic fracturing fluid, which can contain proppants.

Microencapasulant

Microencapsulant refers to all materials within a microcapsule excluding oil field chemicals within the microcapsule and excluding non-polymeric materials within cores or multicores. The microencapsulant can comprise any known polymer material that can form the major portion of a shell or micro-matrix to microencapsulate an oil field chemical. Examples of such materials include, but are not limited to melamine-formaldehyde, urea-formaldehyde, phenol-formaldehyde resin, melamine-phenol-formaldehyde resin, furan-formaldehyde resin, epoxy resin, ethylene-vinyl acetate copolymer, a polypropylene-polyethylene copolymer, polyacrylates, polyesters, polyurethane, polyamides, polyethers, polyimides, polyether ether ketones, polyolefins, polystyrene and functionalized polystyrene, polyvinylalcohol, polyvinylpyrrolidone, cellulose and cellulose derivatives, starch and starch derivatives, polysiloxanes, and mixtures thereof. Preferably, the microencapsulant is a polymeric microencapsulant.

The materials used to form the shell or micro-matrix can also be non-organic-materials, such as silica, calcium carbonate or inorganic polymers, such as polyphosphazenes. The materials used to form the shell or micro-matrix can be organic/inorganic hybrid materials, such as hybrid silica/polyamide materials.

In addition to shell or micro-matrix forming polymers and inorganic materials, a microencapsulant can further comprise emulsifiers and/or stabilisers.

An emulsifier is a surfactant which when present in small amounts facilitates the formation of an emulsion, or enhances its colloidal stability by decreasing either or both of the rates of aggregation and coalescence. [IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: online at goldbook[dot]iupac[dot]org (2006) created by M. Nic, J. Jirat, B. Kosata; updates compiled by A. Jenkins. ISBN 0-9678550-9-8. doi:10.1351/goldbook.] Emulsifiers can be cationic, anionic and nonionic. They can be either low molecular weight or polymeric. Example surfactants include mono- and diglycerides of acetic acid, critic acid, lactic acid, fatty acids, monoglycerides, lecithins, sorbitan fatty acid esters, polyoxyethylene sorbitan esters, sodium lauryl sulphate, sodium laureth sulphate, sodium dodecylbenzesulfonate, dodecyl trimethyl ammonium bromide, hexydecyl trimethyl ammonium bromide, etc.

Stabilizers are substances that are added to a system, such as an emulsion, to prevent or retard a change in the system. Some compounds can function as both emulsifiers and stabilizers, and many stabilizers are polymeric. Examples of stabilizers are: homo- and copolymers of polyvinylalcohol, polyvinylpyrrolidone, polyacrylic acid, sodium carboxyl methylcellulose, hydroxylmethylcellulose, hydroxylpropylcellulose, starch derivatives, maleic-anhydride copolymers such as ethylene-maleic-anhydride copolymer, styrene-maleic anhydride copolymers, vinyl acetate-maleic anhydride copolymer, vinyl ether-maleic anhydride copolymer, methyl vinyl ether-maleic anhydride copolymer, octadecyl vinyl ether-maleic anhydride copolymer, an ethylene-vinylacetate copolymer, a polyacrylic acid based copolymer, a polyvinylpyrrolidone based copolymer, a polyacrylate based copolymer, a polyacrylamide, a polyacrylamide based copolymer, and mixtures thereof. Stabilizers known as Pickering stabilisers that comprise organic or inorganic nano or micro particles, such as nano calcium carbonate or nano silicon dioxide, can also be used.

Preferably, the polymeric microencapsulant is a melamine-formaldehyde, a urea-formaldehyde, a phenol-formaldehyde resin, a melamine-phenol-formaldehyde resin, a furan-formaldehyde resin, an epoxy resin, a polysiloxane, a polyacrylate, a polyester, a polyurethane, a polyamide, a polyether, a polyimide, a polyolefin, polypropylene-polyethylene copolymers, polystyrene, functionalized polystyrene derivatives, gelatin, a gelatin derivative, cellulose, a cellulose derivative, starch or a starch derivative, a polyvinyl alcohol, an ethylene-vinylacetate copolymer, an ethylene-maleic-anhydride copolymer, a styrene-maleic anhydride copolymer, a vinyl acetate-maleic anhydride copolymer, a vinyl ether-maleic anhydride copolymer, a methyl vinyl ether-maleic anhydride copolymer, an octadecyl vinyl ether-maleic anhydride copolymer, a polyacrylamide, a polyacrylic acid, a polyvinylpyrrolidone, a polyvinylpyrrolidone based copolymer, a polyacrylate based copolymer, a polyacrylamide, a polyacrylamide based copolymer, and mixtures thereof. More preferably, the microencapsulant comprises a vinyl ester, an epoxy resin, a polyurethane, a crosslinked polystyrene copolymer, a crosslinked polyacrylate, a melamine-formaldehyde resin, or a polysiloxane.

Oil Field Chemical Delivery Fluid

An oil field chemical delivery fluid comprises a base fluid and microcapsules having an outer surface, where the microcapsules comprise a microencapsulant and an oil field chemical contained within the microcapsules, and the outer surface of the microcapsules comprises one or more chemical groups that interact with the base fluid and promote the dispersibility of the microcapsules in the base fluid. The microcapsule can comprise at least one of the following structures:

(a) a core shell structure comprising (i) a core comprising at least one oil field chemical and (ii) a shell comprising a polymeric microencapsulant;

(b) a core multi-shell structure comprising (i) a core comprising at least one oil field chemical, (ii) a first shell comprising a polymeric microencapsulant located adjacent to the core; and (iii) one or more additional shells located over the first shell, each additional shell comprising a polymeric microencapsulant that is different than the polymeric microencapsulant in an adjacent shell (c) a multi-core shell structure comprising (i) a core comprising a plurality of sub-cores where each sub-core comprises at least one oil field chemical, and optionally having a shell at least partially covering each of the sub-cores, and the sub-cores are dispersed in a non-polymeric compound, a (ii) a shell comprising a polymeric microencapsulant;

(d) a micro-matrix structure comprising a core comprising at least one oil field chemical entrapped within a micro-matrix comprising a polymeric microencapsulant;

(e) a micro-matrix with a shell structure comprising (i) a core comprising at least one oil field chemical entrapped within a micro-matrix comprising a polymeric microencapsulant; and (ii) a shell comprising a polymeric microencapsulant;

(f) a multi-core-micro-matrix with a shell structure comprising (i) a micro-matrix comprising a plurality of sub-cores, where each sub-core comprises at least one oil field chemical, and the sub-cores are entrapped within the micromatrix, and (ii) a shell comprising a polymeric microencapsulant.

FIG. 1A depicts a core shell structure (1) comprising (i) a core (2) comprising at least one oil field chemical and (ii) a shell (3) comprising a polymeric microencapsulant.

FIG. 1B depicts a core multi-shell structure (10) comprising (i) a core (2) comprising at least one oil field chemical, (ii) a first shell (3) comprising a polymeric microencapsulant; and (iii) one or more additional shells (4) that at least partially cover the first shell.

FIG. 1C depicts a multi-core shell structure (11) comprising (i) a core (12) comprising a plurality of sub-cores (1) each comprising at least one oil field chemical within the sub-core (2) and optionally having a shell (5) at least partially covering the sub-cores, and (ii) a shell (3) comprising a polymeric microencapsulant around the core. The multi-core shell structure can also contain one or more additional shells that at least partially cover the first shell as shown in FIG. 1B as item (4).

FIG. 1D depicts a micro-matrix (13) comprising at least one oil field chemical entrapped within a three-dimensional polymeric micro-matrix (7).

FIG. 1E depicts a micro-matrix with a shell structure (14) comprising (i) a micro-matrix (7) comprising at least one oil field chemical entrapped within the micro-matrix, (ii) a first shell (3) comprising a polymeric microencapsulant, where the first shell at least partially covers the micro-matrix; and (iii) one or more additional shells (4) that at least partially cover the first shell. The structure can have only a first shell (3) and not have one or more additional shells (4).

FIG. 1F depicts a multi-core-micro-matrix with a shell structure (15) comprising (i) a core (12) comprising a micro-matrix (7) comprising a three-dimensional polymeric microencapsulant and a plurality of subcores (9) within the micromatrix, (ii) a first shell (3) comprising a different polymeric microencapsulant. The structure can also contain one or more additional shells (not shown) that at least partially cover the first shell, as shown as item 4 in FIG. 1E.

The microcapsules, cores and shells are shown graphically in FIGS. 1A-1F as circles for ease of illustration. The microcapsules, cores and shells can have any shape, including, but not limited to a rod, an ovoid, a pseudo-cuboid, etc.

The microcapsules comprise two groups of components: (1) oil field chemicals or mixtures of oil field chemicals with non-polymeric compounds and (2) a microencapsulant. The oil field chemicals are contained by one or more microencapsulants. The microencapsulants form shells and/or micro-matrixes in a microcapsule. The microencapsulant comprises polymeric organic or inorganic materials. The microencapsulant can further comprise emulsifiers and/or stabilisers. The oil field chemical can be present at 1 to 99.5% by weight of the microcapsule. Preferably the oil field chemical is present at 2 to 98% by weight of the microcapsule. The oil field chemicals are present in cores, sub-cores or multi-cores within the microcapsules. The oil field chemicals can be present at 2 to 100% by weight of the total cores in a microcapsule. Preferably the oil field chemicals are present at 5 to 100% by weight of total cores. Individual molecules of oil field chemicals can be present in micro-matrixes or shells around the core.

The microcapsules can comprise one or more shells. In the structure of core-multi-shells or micro-matrix-shell or micromatrix-multi-shells, additional shells can comprise a microencapsulant that is different than the microencapsulant in an adjacent shell.

At least one oil field chemical must be present in a microcapsule. In structures where the microcapsule comprises more than one shell, the additional shells can comprise oil field chemicals that are either the same or different than the oil field chemicals in the core, multicores, first shell or the micro-matrix. Preferably, the oil field chemicals in all the shells in a microcapsule can account for 0-49.5% by weight of the total amount of oil field chemicals in the microcapsule. Preferably, the oil field chemicals in all the shells account for 0-30% by weight of the total oil field chemicals in a microcapsule.

The microencapsulant can account for 10-100% of the mass of the shells. Preferably, the microencapsulant accounts for 20-100% of the mass of the shells. Within the microcapsules, the shells account for 0.5-95% of the total mass of the microcapsules and the cores account for 5-99.5% of the total mass of the microcapsules.

The microcapsules can have an average particle size of between 0.05 µm and 600 µm, inclusive. Preferably the average particle size is between 0.1 µm and 500 µm, inclusive. The size of the microcapsules can be determined by a laser diffraction technique using a Malvern or Sympatec instrument. This method measures the volume weighted diameter of sphere particles directly. For non-spherical particles, volume equivalent spherical diameter is measured. Mean (arithmetic average), mode (most frequent) or median (where 50% of the population is below/above) values can be taken as representative particle size of a population. As used herein, the measured volume weighted mean diameter of the microcapsules is taken as the representative particle size of the microcapsules.

The oil field chemical delivery fluid can contain more than one oil field chemical and at least one of the oil field chemicals is within the core or matrix in the microcapsules. An oil field chemical within the microcapsules can also be present outside the microcapsules. When an oil field chemical is encapsulated in the microcapsules and is also present outside the microcapsules in the oilfield chemical delivery fluid, at least 50.1% of the total amount of this oil field chemical is preferably contained inside the microcapsules.

Microcapsule Surface with Defined Chemical Groups for Stable Formulation and Directed Delivery In one aspect of the invention, the microcapsules comprise one or more shells. Microcapsules having core-multishell, micro-matrix-shell, or micromatrix-multi-shell structures can have additional shells. These additional shells can comprise a microencapsulant that is either the same as, or different than the microencapsulant in the first shell or the micro-matrix. For microcapsules with one or more shells, the outer surface of the outer shell of the microcapsule is the outer surface of the microcapsule. In another aspect of the invention, the microcapsules comprise micro-matrixes without shells. For these microcapsules, the outer surface of the micro-matrixes is the outer surface of the microcapsules. The outer surface of a microcapsule is part of the microcapsule.

In one aspect of the invention, the outer surface of the microcapsules contains one or more chemical groups that interact with the base fluid and promote the dispersibility of the microcapsules in the base fluid. Examples of such groups include, but are not limited to a carboxylate, a sulphonate, an alkyl sulphate, an aryl sulphate, an amide, an amine, an alkylated amine, an anhydride, a carbonyl, an acetyl, a hydroxyl, a phosphate, a sulfate, a nitrile, a nitro, an ester, a thiol, an aldehyde, a quaternized amine, an N-alkylamide, an N-methylol, a silanol, a pyrrolidonyl, a pyridine, a pyrimidine, a triazine linkage, an ethylene linkage, a styrenic linkage, a propylene linkage, and a glucose unit.

The chemical groups at the outer surface of the microcapsules that promote dispersibility of microcapsules in a base fluid can account for 0.05% to 80% of the total chemical groups present at the outer surface of the microcapsules.

It is another aspect of the invention that the outer surface of the microcapsules contains one or more chemical groups that can interact with targeted areas of a hydrocarbon reservoir and promote the substantivity of the microcapsules towards the targeted areas of the hydrocarbon reservoir. Examples of such groups include, but are not limited to a methyl, an ethyl, an ethylenic linkage, a propylene linkage, triazine linkage a urethane linkage, an urea linkage, a biuret linkage, a triazine linkage, an ethylene linkage, a styrenic linkage, a propylene linkage, or a glucose unit, a carboxylate, a sulphonate, an alkyl sulphate, an aryl sulphate, an amide, an amine, an alkylated amine, an anhydride, a carbonyl, an acetyl, a hydroxyl, an isocyanate, a phosphate, a sulfate, a nitrile, a nitro, an ester, a thiol, an aldehyde, a quaternized amine, an N-alkylamide, an N-methylol, a silanol, a pyrrolidonyl, a pyridinyl and a pyrimidinyl.

The chemical groups at the outer surface of the microcapsules that promote substantivity of microcapsules to targeted areas of a hydrocarbon reservoir can account for 1% to 100% of the total chemical groups present at the outer surface of the microcapsules.

The outer surface of the microcapsules can contain groups that can convert to the above chemical groups under conditions found in the reservoir. Examples of such groups are esters, silyl groups and ethers.

The outer surface of the microcapsules can also contain chemical groups which neither promote dispersibility in the base fluid nor promote substantivity to the targeted areas of a hydrocarbon reservoir.

The combination of the two or more groups of chemical groups that promote dispersibility and substantivity of the microcapsules ensure the desired properties and performance of microcapsules. By striking a balance between these two groups of chemical groups, the microcapsules can be dispersed in a water based fluid as well as an oil based fluid. In a hydrocarbon environment, the surface groups can adjust so that the microcapsules are substantive to certain areas of the reservoir. For example, when the microcapsules are in contact with the surface of a complex mixture, such as crude oil containing formation which comprises both polar/hydrophilic components and apolar/hydrophobic components, the different polar and apolar groups at the outer surface of the microcapsules can organize to allow maximum contact, leading to adsorption of the microcapsules at the oil containing formation. Some of the charged groups in the crude oil and formation can also interact with groups at the outer surface of the microcapsules.

One targeted area is an oil rich formation. Oil and gas deposits are found in sandstones and coarse-grained limestones. Sandstone and limestone have structures like a hard sponge with holes and pores, but they are not compressible. These holes or pores can contain water, oil or gas, and the rock can be saturated with one of the three, or mixtures thereof. Sandstone and limestone are essentially inorganic materials. Sandstone is composed of quartz and/or feldspar and contains the sodium, potassium or calcium salts of aluminium silicate. Limestone is a sedimentary rock composed largely of the minerals calcite and aragonite, which are different crystal forms of calcium carbonate.

Crude oil is essentially a mixture of many different hydrocarbons of varying lengths and complexities. The hydrocarbons in crude oil are mostly alkanes, cycloalkanes and various aromatic hydrocarbons. Other organic compounds in crude oil, generally present in minor amounts, contain nitrogen, oxygen and sulfur, and trace amounts of metals such as iron, nickel, copper and vanadium. The exact molecular composition of crude oil varies widely from formation to formation. The proportion of the chemical elements in the crude oil also varies. For example, there can be up to: 85% of carbon, 14% of hydrogen, 2% of nitrogen, 1.5% of oxygen and 6% of sulphur.

As a result of the complex composition, besides the apparent hydrophobicity of oil and hydrophilicity of formations, the surface and charge properties of the oil containing formation can be complicated. For example, it is reported that the asphaltene particles contained in the crude oil can bear positive charge under reservoir conditions.

By controlling the chemical groups and properties of the outer surface of the microcapsules, the microcapsules can have a coordinated interaction with an oil containing formation. This allows the microcapsules to be led or directed to, accumulated or deposited at, around or onto the oil containing formation of a reservoir.

The substantive accumulation and deposition of microcapsules in oil field chemical delivery fluids to targeted areas of a hydrocarbon reservoir is one important aspect of the invention.

The microcapsules can also be made to substantively deposit onto a carrier component within an oil field chemical delivery fluid. The carrier component can carry the microcapsules comprising an oil field chemical to positions where the carrier component is destined. An example is when a hydraulic fracturing fluid is used as a base fluid. Many hydraulic fracturing fluids contain a significant fraction of proppants. Proppants are solid particulate materials with a size of hundreds of micro meters. They are delivered to fractured formations to keep the fractures open. The space between the packed proppants provides the path for hydrocarbons to flow out of the fractures. Proppants are typically treated sand or man-made ceramic materials. There are also proppants made of polymers. Sand or ceramic proppants can be coated with an organic polymer resin. Based on the properties of the proppants, microcapsules can also be designed so that they can be deposited to the surface of the proppants within a hydraulic fracturing fluid, resulting in an oil field chemical delivery fluid which will carry the oil field chemicals within the microcapsules to the fractures. This will greatly increase the efficiency in delivering the tracer to the desired locations within the reservoir and reduce the amount of tracer that can move to areas in the reservoir that it is not needed.

Density of Microcapsules

The microcapsules contained in the oil field chemical delivery fluid can have bulk densities that are purposely set to aid in the transport of the microcapsules to targeted areas. This can be achieved by pre-treating and formulating the oil field chemicals before they are microencapsulated or using a different microencapsulation process. A microcapsule contained in the oil field chemical delivery fluid in this invention can have a bulk density greater than, the same as, or less than the density of the base fluid used to make the oil field chemical delivery fluid.

The benefit of this property is that after injection, the density of the microcapsule can help direct the movement of the microcapsules to targeted areas. This provides an additional way to control the delivery of the microcapsules and help increase the efficiency in delivering the oil field chemical to the targeted location. For example, in a horizontal well, heavy microcapsules can tend to move to rock formations below the well horizontal line, while light microcapsules can tend to move to rock formations above the well horizontal line. Microcapsules with density comparable to that of the base liquid can move either way or travel to other formations along the horizontal direction.

All the microcapsules in an oil field chemical delivery fluid can have the same (100±5%) density, which is greater, less or equal to the density of the base fluid. The microcapsules can contain one identical or more oil field chemicals.

The oil field chemical delivery fluid can comprise microcapsules with two or more different densities. The densities can be greater than, equal to, or less than the density of the base fluid of the oil field chemical delivery fluid. The microcapsules can contain one or more oil field chemicals. Within an oil field chemical delivery fluid, a first group of microcapsules can comprise one oil field chemical where all of these microcapsules have the same density that is greater than, less than or equal to that of base fluid, while a second group of microcapsules comprise a second oil field chemical where all of these microcapsules have a density that is different than the density of the microcapsules in the first group of microcapsules.

Changeable Cores of Microcapsules

Cores or multi-cores of the microcapsules can be changeable under certain conditions. A particular change is a phase change (e.g. melting) of cores or multi-cores. For example, an oil field chemical can be mixed with a non-polymeric compound having a melting point much higher than room temperature and comparable to the temperature of a hydrocarbon reservoir. After microencapsulation, the mixture of the oil field chemicals and the non-polymer compounds form the cores or multi-cores of the microcapsules, which remain solid in the formulated oil field chemical delivery fluid at room temperature, but melt into a liquid in a hydrocarbon reservoir with a temperature close to the melting point of the cores or multi-cores. Such changes in the core or multi-core can add be used to control the release of the oil field chemicals. The phase change is different than the degradation of the microcapsules because the microcapsules still are present.

Physical State of Oil Field Chemical Delivery Fluid

The microcapsules are dispersed as individual particles in the oil field delivery fluids of this invention. This is made possible by the above described chemical groups being present in the outer surface of microcapsules.

After preparation of the oil field chemical delivery fluid, the microcapsules can stay suspended for the required time to allow their delivery to a targeted area in the reservoir. In microcapsules with desired densities that are either greater or less than the density of the base fluid, the densities of microcapsules can be controlled based on known properties of the base fluid, including its density, the presence and the viscosity of modifiers and stabilisers, and the properties of the microcapsules, such as the size of the microcapsules and the type and amount of chemical groups present at the surface of microcapsules. For example, if the base fluid is viscous (e.g. a gel type fracturing fluid or polymer containing flooding fluid) or if there are already a certain amount of stabilisers present in the base fluid, and the microcapsules are small and have a high number of dispersion promoting chemical groups on long chains or the chemical groups are charged, a large difference between the density of the microcapsules and the base fluid can be tolerated and the microcapsules can still remain dispersed in the base fluid without settling to the bottom or floating to the top (creaming) of the base fluid. If the base fluid is thin (e.g. slick water type fracturing fluid) or if there is only a small amount of stabiliser present in the base fluid, and the microcapsules are large and have a small number of dispersion promoting chemical groups on short chains or the chemical groups are all neutral, for the microcapsules to remain dispersed in the base fluid without settling to the bottom or floating to the top (creaming) of the base fluid for a long time, only a small difference between the density of the microcapsules and the base fluid can be tolerated. The density can be controlled so that the microcapsules can remain suspended without obvious floating to the top (creaming) or settling to the bottom of the base fluid before the formulated oil field chemical delivery fluid is transported to targeted areas of the hydrocarbon reservoir. On the other hand, after injection of the oil field chemical delivery fluid, the density of the microcapsules can accelerate the movement of the microcapsules in the desired direction, i.e., either above or below the horizontal lines of the horizontal well. Such a treatment usually needs the microcapsules to remain suspended for at least several days. For microcapsules with densities equal to the density of the base fluid, the time for the microcapsules to remain suspended is expected to be longer than those with densities greater than or less than the density of the base fluid.

Once the oil field chemical delivery fluid is injected into a hydrocarbon reservoir and reaches the targeted area of the hydrocarbon reservoir, the microcapsules within the oil field chemical delivery fluid are in a process of dynamic change due to the interaction between the microcapsules and the targeted area of the reservoir. As a result of the interaction induced by the substantive chemical groups on the outer surface of the microcapsule with targeted areas of the hydrocarbon reservoir, the microcapsules start to accumulate at, around and onto the targeted areas of hydrocarbon reservoir. During this process, many microcapsules will remain suspended within the oil field chemical delivery fluid. The substantive accumulation of the microcapsules helps accumulate microcapsules comprising the oil field chemical in the targeted areas of the hydrocarbons. This helps in increasing the efficiency in delivering the oil field chemicals to the targeted areas. The accumulated microcapsules later release the oil field chemicals from within the microcapsules into the targeted areas of the hydrocarbon reservoir.

In another aspect of the invention, the microcapsules described above can all have the same controlled bulk density, which can be equal to, greater than or less than the apparent density of the base fluid used to make the oil field chemical delivery fluid. It is another aspect of the invention that the microcapsules described above can have different bulk densities which can be equal to, greater than or less than the apparent density of the base fluid used to make the oil field chemical delivery fluid. The density of the microcapsules can also induce the microcapsules to preferentially travel to certain areas of a hydrocarbon reservoir. For example, while microcapsules with the same density as the base fluid can travel to areas in a hydrocarbon reservoir which are either above, below or along the horizontal plane of a horizontal well penetrating the reservoir, microcapsules lighter than the base fluid tend to travel to the areas above the horizontal plane of a horizontal well penetrating the reservoir, and microcapsules heavier than the base fluid tend to travel to the areas below the horizontal plane of a horizontal well penetrating the reservoir. The effect of directing the travel of microcapsules by controlling the densities of the microcapsules can be used in combination with the substantivity of the microcapsules in an oil field chemical delivery fluid to deliver oil field chemicals to targeted areas of a hydrocarbon reservoir. For example, an oil field chemical microencapsulated into microcapsules with slightly lower density than the base fluid are targeted to be delivered to areas in a hydrocarbon reservoir which are above the horizontal plane of a horizontal well penetrating the reservoir; and vice versa, an oil field chemical and microencapsulated into microcapsules with slightly higher density than the base fluid are targeted to be delivered to areas in a hydrocarbon reservoir which are below the horizontal plane of a horizontal well penetrating the reservoir.

Release of Oil Field Chemicals from Oil Field Chemical Delivery Fluid to Targeted Area of the Reservoir The driving force for the oil field chemical to be released from the microcapsules is that the oil field chemicals have a chemical affinity to some of the constituents in the targeted areas of a hydrocarbon reservoir. For example, an oil soluble tracer tends to be transferred into crude oils within the formations of a reservoir. The release process can be accelerated by the high temperature within the areas of the reservoir.

Oil field chemical can be released from the microcapsules within the oil field chemical delivery fluid to the base fluid and then the released oil field chemical can migrate to the targeted area. The release can be promoted by contact between the microcapsules and targeted area of the reservoir. The contact can be induced by Brownian motion of the microcapsules. The substantive accumulation of microcapsules at, around and onto the targeted areas of the reservoir can significantly promote the release of oil field chemicals.

The oil field chemicals can be released from within the microcapsules to the hydrocarbon reservoir in different ways. In the first way, the oil field chemicals can be released from within the microcapsules to the reservoir fluids through permeation. The polymeric microencapsulants forming the shells and/or micro-matrices within the microcapsules do not need to be dissolved, eroded or degraded. In this way, the microcapsules can release the oil field chemicals from within the microcapsules without dissolution or eroding or degradation. In a second way, the microencapsulants forming the shells and/or micro-matrices within the microcapsules can be partially dissolved, eroded or degraded under the conditions of targeted areas of the reservoir and forming pores so that the oil field chemicals are released from the microcapsules to targeted areas. In the third way, the shells and/or micro-matrices can be dissolved, eroded or degraded entirely so that the oil field chemicals are released.

The release of the oil field chemicals from the microcapsules in the oil field chemical delivery fluid to the targeted formations can be controlled. Oil field chemicals can be released when the oil field chemical delivery fluid comes in contact with a targeted area of the reservoir which can have a defined pressure and temperature. In the situation where the microencapsulant is not dissolved/degraded/eroded, the structure of the microcapsules remains intact during the release of the compounds. In the situation that the microencapsulant is only partially dissolved, eroded or degraded, fresh pores are formed within the framework of the shell and/or micro-matrix of the microcapsule. The microencapsulant, along with any shells in the microcapsules can control the permeation of fluids to release the oil field chemical compounds from the microcapsules.

Cores or multi-cores of the microcapsules can also help to control the release of the oil field chemicals within the microcapsules. The cores or multi-cores of the microcapsules can be made so that they undergo changes under certain conditions. Changes in the core or multi-core can be used to add control to the release of the oil field chemicals. For example, core or multicores comprising an oil field chemical can be made to have a melting point comparable to the temperature of a hydrocarbon reservoir. The cores or multi-cores of the microcapsules will remain solid in the formulated oil field chemical delivery fluid at room temperatures. After injection and reaching the areas of the hydrocarbon reservoir with high temperature, the cores or multi-cores are melted into liquid which can facilitate the release of the oil field chemicals.

Depending on the requirement, the release of the oil field chemical can last from 1 hour to more than 3 hours, to more than 6 hours, to more than 12 hours, to more than 24 hours, to more than 7 days, to more than half a month, to more than 1 month, to more than 3 months.

The advantage of a controlled release of an oil field chemical is that the amount of the oil field chemical present at the targeted area of a hydrocarbon reservoir becomes more predictable. This will aid the control of the well treatment, and in the case of tracer as the oil field chemical, the degree of the quantification associated with flow monitoring and tracing.

Preparation of Oil Field Chemical Delivery Fluid

The oil field chemical delivery fluid can be prepared in a three step process. First, an oil field chemical is selected based on the intended use of the oil field chemical delivery fluid. If necessary, the oil field chemical can undergo pre-treatment and formulation. In the second step, the oil field chemical is microencapsulated to obtain microcapsules. In the third step, the microcapsules are formulated into a base fluid to obtain an oil field chemical delivery fluid.

Selection, Pre-Treatment and Formulation of Oil Field Chemicals

Oil field chemicals are selected for the purposed reservoir operation or well treatment. The oil field chemicals selected can be pre-treated or formulated. For example, solid oil field chemicals can be granulated or pulverised to form particles of a more uniform size. The size distribution of the particles, which can affect the release rate of the oil field chemical, can be adjusted to a desired distribution. Solid oil field chemicals in powder form with a larger particle size than desired, can be milled or ground. If the solid oil field chemicals are directly encapsulated, their size should be less than the desired size of the microcapsules to allow for an increase in size with the addition of the microencapsulants and any shells that can be added.

The oil field chemicals can be mixed with polymeric or non-polymeric compounds. One aim of such a formulation is to obtain a mixture of oil field chemicals with a desired density so that the microcapsules formed using these oil field chemicals can have a density greater than, less than or equal to the density of base fluid.

The oil field chemicals can be formulated to obtain a mixture such that the cores or multi-cores of the final microcapsules can have desired melting points close to the temperature of the targeted areas in a targeted hydrocarbon reservoir.

Microcapsule Formation

The step of forming a plurality of microcapsules can comprise a physical method, a chemical method or a physico-chemical method. The physical method can be selected from the group consisting of spray drying, fluidised bed coating and co-extrusion, and solvent evaporation.

It is preferred that microcapsules are made by spray drying a mixture of oil field chemicals and polymers.

In another preferred method, microcapsules containing oil field chemicals are made by co-extrusion of two phases of polymers or mixture of polymers. An inner phase is a mixture a polymer or prepolymer containing oil field chemicals. An outer phase is a mixture of a polymer or prepolymer containing either no oil field chemicals or less oil field chemicals than are present in the inner phase.

Chemical methods can be used to form microcapsules by in-situ reaction. A preferred chemical method of this invention forms microcapsules by the in-situ polymerization of monomers distributed in an emulsion containing one or more oil field chemicals. The term "emulsion" is used to describe a fine dispersion of one liquid in another in which it is not soluble or miscible. The term emulsion, as used herein, includes microemulsion, mini-emulsion to normal emulsions and suspensions. An emulsion can be a discontinuous internal oil phase in a continuous water phase (O/W) or an internal water phase in a continuous oil phase (W/O). The emulsion can be more complicated with an internal phase itself being a dispersion, thus a W/O/W or O/W/O type of emulsion. The polymerisation can occur in the water phase, the oil phase or the interphase between water and oil phases, more than one of the above phases or in all of the above phases. Thus the polymerisation can be termed emulsion polymerisation, mini-emulsion polymerisation, microemulsion polymerisation, suspension polymerisation, colloid polymerisation, interfacial polymerisation, etc. The polymerisation can be either addition polymerisation of vinyl monomers or condensation polymerisation of corresponding monomers and prepolymers. Initiators and/or catalysts can be used. Examples of vinyl monomers are acrylamide, acrylic acid, acrylic esters, methacrylic acid, methacrylic esters, styrene, 4-vinylbenzyl chloride, divinylbenzene, methylenebisacrylamide, etc. Examples of condensation polymers are melamine-formaldehyde resin, phenol-formaldehyde resin, urea-formaldehyde resin, epoxy resin, urethane/urea resin, polyester resin etc.

Microcapsules with core shell structures can be prepared by dispersing an oil field chemical, a mixture of an oil field chemical with non-polymeric materials, or a mixture of an oil field chemical with non-polymeric materials and monomers into small particles in the form of an emulsion with the aid of physical force and emulsifiers. Stabilizers can be used to stabilize the emulsions when they are formed. Monomers or prepolymers can be distributed in the interphase, the continuous phase or in both phases. The monomers are polymerised and deposited on the cores or other shells to form the shells. A pre formed polymer can also be added to the emulsions and deposited together with newly formed polymers to form the shells. The polymer can be cured during or after the polymerisation process. Alternatively, monomers or prepolymers can be deposited on the core and then the prepolymers can be cured to form a polymer coating. Oil field chemicals can also be added to the continuous phase. Overall, more oil field chemicals are present in the dispersed internal phase than in the continuous phase.

Micro-matrix type microcapsules can also be formed by polymerisation from emulsions. A mixture of oil field chemicals with a high concentration of monomers, prepolymers, a combination of monomers and prepolymers, or a combination of monomer/prepolymer and a preformed polymer, can be dispersed to form an emulsion. Polymerisation and/or curing (crosslinking) of monomers inside droplets or a dispersed internal phase can form a micro-matrix containing oil field chemicals. During this process, the structure of the mixture will undergo changes. For example, at the beginning of the process, the oil field chemicals are molecularly distributed, however at the end of the process, they can form very fine phases in the microcapsules or can remain molecularly distributed.

The physico-chemical method can be coacervation phase separation.

By using one of the methods or combinations of the above methods, microcapsules containing oil field chemicals with structures specified above can be made.

Micro-matrixes, core shell particles or micro-matrixes with shells can be prepared beforehand. These micro particles can then be exposed to gas or liquid oil field chemicals or mixtures of oil field chemicals with non-polymeric compounds and the oil field chemicals can be absorbed and/or adsorbed by the microparticles.

In one aspect of the invention, a composition having two or more different microencapsulants can be formed by microencapsulating a microcapsule with a core shell structure, micro-matrix structure or a micro-matrix-shell with one or more microencapsulants. As such, a double shell or different micro-matrix-shell structure or micro-matrix-double shell structure can be formed.

Besides double microencapsulation, microcapsules can be treated after they are formed. The treatment can be physical or chemical. For example, one or more different chemicals can be added to the emulsion system after the formation of the microcapsules. In such treatments, no additional shell is formed. Rather the surface properties of the microcapsules are altered due to adsorption or reaction at the outer surface of the pre-formed microcapsules. The chemical can have physical interaction, such as deposition, or chemical reaction with first formed shells or micro-matrixes. As such, the properties of the microencapsulant can be modified, for example, to allow different chemical groups to become attached to the outer surface of the microcapsules or to enhance the stability or barrier properties of the microencapsulant.

Both solid and liquid oil field chemicals can be microencapsulated. The microcapsules can be recovered as dispersions, wet cakes or solid powders. A dispersion can be formed directly from microencapsulation and/or in any subsequent post-treatment. A wet cake can be obtained by filtration, centrifugation or other method that separates solid from liquids. The wet cake can be dried (e.g., by evaporation of solvent or water in the air, drying in a vacuum oven, or fluidised bed) to obtain solid powders. It is important to control the conditions used in forming and isolating the microcapsules so that the oil field chemicals in the microcapsules are not to be released pre-maturely during these post-treatment, separation or drying processes.

Introduction of Defined Chemical Groups to Microcapsules

Particular chemical groups can be directly introduced into the outer surface of the microcapsules during the microencapsulation process through selection of the appropriate microencapsulants, along with the selection of the appropriate methods of microencapsulation and control of the conditions used in the microencapsulation process. For example, in an emulsion polymerisation process, the choice of both monomers and stabilisers will have a critical impact on the composition of the chemical groups present at the outer surface of the microcapsules. For example, the use of acrylic acid or methacrylic acid monomer, as well as emulsifiers/stabilisers, such as polyacrylic acid or acrylic acid based copolymers, can provide carboxylate group at the surface of the final microcapsules. By adjusting the pH during polymerisation and the remainder of the process, the states of the carboxylate groups can be controlled.

Formulations comprising polymer forming monomer/prepolymers, polymers and emulsifiers/stabilisers to form the final microencapsulants of the microcapsules can be carefully prepared to provide the outer surfaces of the microcapsules with an optimal composition having particular chemical groups.

Chemical groups can also be introduced to the surface of the microcapsules through double microencapsulation and post-treatment of microcapsules. In double microencapsulation, a second shell of a microencapsulant that is different from the first shell or micro-matrix of the initial microcapsules can be used. The second shell will contain the desired groups in the outer surface of the microcapsules. In post treatment, the outer surface of the initial microcapsules can be modified by reactions with chemicals where the product of the reaction has the desired groups in the surface of the microcapsule. One particular post treatment is grafting of new polymers onto the surface of the microcapsules.

By microencapsulating oil field chemicals and post-treating the microcapsules using the above methods, microencapsulated oil field chemical with various functional chemical groups on the outer shells can be prepared. The functional chemical groups can be reactive. Examples of such chemical groups can be selected from the group consisting of carboxylates, amines, quaternised amine, anhydrides, hydroxyls, isocyanates, phosphates, nitriles, esters and aldehydes, silanols, N-methylols, etc.

Formulation of Microcapsules with Base Fluid

Oil field chemical delivery fluid is prepared by formulating the microcapsules comprising oil field chemicals with a base fluid suitable for the purpose of the well operation or treatment. For example, for monitoring and tracing fluids produced from a reservoir after hydraulic fracturing, microcapsules comprising tracers can be formulated with a hydraulic fluid, which is selected as the base fluid.

The formulation process is a mixing process. In some combinations, microcapsules in the form of a dispersion, a wet cake or solid powder can be added to the base fluid and then stirred to obtain a homogeneous mixture. A number of machines, such as Disperx units, known in the art can be used.

As the microcapsules have defined chemical groups at their outer surface to promote dispersing these microcapsules in the base fluid, the oil field chemical delivery fluid in this invention can be can be prepared by formulating the microcapsules with a base fluid without the addition of extra emulsifiers or stabilisers added. Particularly, if an existing well treatment fluid, such as a hydraulic fluid, is used as the base fluid to formulate with the microcapsules, the use of extra emulsifiers or stabilisers can be avoided. This can help retain the properties of the well treatment fluid.

The microcapsules can also be formulated into a base fluid with the addition of certain amount of emulsifiers or stabilisers. The emulsifiers/stabilisers can bring extra stability to the oil field chemical delivery fluid, particularly when the microcapsules are formulated with water, brine water or water produced from a hydrocarbon well.

Injection of Oil Field Delivery Chemical Fluid

To deliver the oil field chemicals, the oil field chemical delivery fluid containing microcapsules comprising the oil field chemicals are injected down hole in a well penetrating a hydrocarbon reservoir.

Dispersion of Microencapsulated Particles

The microencapsulated oil field chemical particles can have good dispersibility in a base fluid compared to oil field chemicals that are not microencapsulated. As an example, the dispersibility of a solid oil soluble tracer (tracer A) in slick water was studied. Pure tracer A is very hydrophobic and has a density of 2.4 g/cm$^3$ at 25° C. and 1 atm. The tracer is soluble in an organic solvent (a cyclic terpene, density 0.84 g/cm$^3$). Three solutions of the tracer in this solvent containing 15%, 20% and 22% of the tracer were made. The density of the three solutions was about 0.93, 0.98 and 0.99 g/cm$^3$ respectively.

A water solution containing 0.1% g poly(acrylamide-co-acrylic acid) partial sodium salt (a friction reducer), 0.075% 1-butanol and 0.075% g ethylene glycol butyl ether (surfactant/co-surfactant) was used as a model slick water. The slick water was a clear solution.

Attempts to disperse the pure solid tracer or the tracer/organic solvent solutions into the slick water failed. The pure solid tracer stayed on the surface of the water when low shearing force (e.g. simple stirring with a spatula) was used and settled to the bottom after high shearing was used (Comparative Example 1). Each of the three tracer solutions formed big drops (~2 mm) under shearing in the slick water and coalesced to form even bigger drops that floated to the top of the slick water (Comparative Example 1-3).

The pure tracer A and solutions of the tracer were readily microencapsulated and recovered as either solid powder or wet cake (Examples 1, 3 and 6-8). The microcapsules were made using carboxylate methylcellulose as stabilisers and melamine-formaldehyde resin as the shell forming materials. The microcapsules had triazine, methylene and methylene-oxygen-methylene linkages at their outer surface (>90%) as well as carboxylate and glucose units (<10%). The composition of the surface of the microcapsules was adjusted to allow for the microcapsules to be dispersed in the base fluid. The presence of the glucose units and carboxylate groups make the microcapsules well dispersible in water without adding any extra emulsifiers. Both the microencapsulated tracer powder and the wet cake were dispersed in the slick water easily with simple stirring using a spatula. Microcapsules prepared using pure tracers were denser than the slick water. The microcapsules made by microencapsulating the tracer solutions containing 15%, 20% and 22% of tracer had densities less than, roughly equal to and higher than that of the slick water respectively. All of these microcapsules were able to stay suspended in the slick water for longer than 24 hours. The heavy microcapsules from microencapsulation of the solid tracers tended to settle to the bottom of the vials gradually while the lighter microcapsules tended to float to the top of the slick water slowly, from above 24 hours to more than 7 days. The settled microcapsules remained as individual microparticles and were able to be re-dispersed back into the slick water readily with slightly shaking or stirring with a spatula. This is in sharp contrast to pure tracer A, which alone is impossible to be dispersed in the slick water. The un-microencapsulated tracer solutions can only form a coarse dispersion in the slick water and tend to quickly re-separate from the water and float to the top of the water.

The dried microencapsulated tracer particles in powder form can also be dispersed in an oil, such as a synthetic oil.
Substantive Deposition of Microcapsules at Targeted Areas of a Hydrocarbon Reservoir and Added Control Through Density Adjustment The microencapsulated oil field chemical particles can show substantivity towards targeted areas of a hydrocarbon reservoir. This is shown in the Examples by the interaction between the microcapsules made in Example 3 and 6 and crude oil or crude oil containing rock formations from different parts of the world (Mid-East, Central Asia and South America).

The crude oil containing subterranean formation sample was taken at a horizontal well (3250 meter below the surface) at a South American oil field. The oil contained in the formation appeared to be quite heavy and when the formation was dipped in water, the oil tended to stay at the bottom of the water with the formation. When microcapsules containing tracers (made in Example 3 and 6) were dispersed in slick water at room temperature, turbid dispersions were obtained. When these dispersions were mixed with the crude oil containing formation described above, it was surprisingly found that the dispersions became clear much more quickly compared to pure microcapsule/slick water dispersions or dispersions mixed with ceramic proppants. In both cases, deposition of microcapsules onto the crude oil containing formation was observed. This shows that the microcapsules were substantive towards the crude oil containing formation (Example 5 & 10).

In pure deionised water, microcapsules showed similar substantive behaviour towards the crude oil containing formation (Example 13, 14).

There was an interaction between the microcapsules and the crude oil containing formation. The microcapsules have linkages of triazine, methylene and methylene-oxygen-methylene at their outer surface (>90%) and also carboxylate and glucose units (<10%). The crude oil containing formation contained both inorganic rock and heavy crude oil. The crude oil contained, besides simple hydrocarbons, compounds of highly aromatic moieties and hybrid elements such as oxygen, nitrogen and sulphur (e.g. asphathalenes, kerogens), some of which are charged. The crude oil containing formation works apparently in a way similar to a coagulant/flocculent that allows substantive deposition of microcapsules onto the formation.

The density of the microcapsules appears to play a role in deterring or accelerating the deposition of the microcapsules. The denser microcapsules showed rapid deposition towards the heavy crude oil formation at the bottom of the slick water/water (in 2-5 hours, Example 5), and the lighter microcapsules took longer (up to 24 hours, Example 10). Additional levels of control of the delivery of microcapsules comprising oil field chemicals to a targeted area of a hydrocarbon reservoir can be achieved through adjusting the density of the microcapsules.

Substantive interaction between microcapsules and the crude oil were also observed. (Example 11).
Controlled Release of Oil Field Chemicals to Targeted Areas The release of microencapsulated oil field chemicals to targeted areas can be controlled. This is shown by the release of microencapsulated tracer into synthetic oil in Examples 2, 9 and 11. Powders of microencapsulated tracer dispersed in synthetic oil can release >95% of the tracer into the oil in about 12 hours, while microencapsulated tracer dispersed in slick water can be released into synthetic oil in contact with the mixture in about 24 hours (Example 2 and 9). The release of tracer from the microcapsules appeared to follow a linear pattern and is controlled. It has also been shown that the release of tracer from microcapsules into crude oils can be very efficient (Example 11). These release times are suitable for certain types of well treatments and operations. The release time can be adjusted to provide a longer release period based on particular requirements of oil field operations.

The microcapsules are not dissolved, degraded or eroded by the oils or water that are in contact with the microcapsules during the release of the tracers.
Delivery of Well Treatment Agents for Well Treatment The compositions and methods described herein can be used for well treatment. An oil field chemical can be a well treatment agent. The well treatment agent is microencapsulated using the methods and materials needed to obtain microcapsules with the desired density and chemical groups at their outer surface. The microcapsules can be then formulated with a base fluid and injected downhole to the targeted well at the appropriate step in the operation of a well. For example, a biocide can be microencapsulated such that the surface of the microcapsules have chemical groups which allow the microcapsules to be dispersed into a base fluid and delivered to areas within the reservoir where bacteria grows and causes issues such as emission of hydrogen sulfide and corrosion. The microcapsules can be formulated in a simple water borne base fluid for solely bacteria control, or as an adjuvant treatment to an existing well treatment fluid such as a hydraulic fracking fluid or chemical flooding fluid used for improved oil recovery. In a similar manner, other types of well treatment agents described in the above sections, can be microencapsulated and formulated with a base fluid.

The injection of such oil field chemical delivery fluids allows the oil field chemical to be placed at or delivered to near well bore positions of well casings and/or reservoir formations to provide well treatment or intervention.

Delivery of Tracers and Methods for Monitoring and Tracing Flow of Fluid within and Out of a Hydrocarbon Reservoir The compositions and methods described herein can be used for monitoring and tracing the flow of fluid within and out of a hydrocarbon reservoir. An oil field chemical can be a tracer. The methods described herein are particularly suitable for delivering tracers to targeted areas of a hydrocarbon reservoir to allow the flow of fluids within and out of different areas of reservoir to be detected and traced.

It is advantageous that tracers can be delivered more precisely and evenly and released controllably to targeted areas of a hydrocarbon reservoir, either particular reservoir formations positions or even well casing areas. The tracer can be detected in a flow back liquid of the injected well, or, for interwell operation, in an offset well. As the amount of tracer delivered and released becomes more predictable, tracer flowback can be better modeled and improved quantification of flow is possible.

The reservoir to be monitored and traced by the above methods can be one of the following: (a) a reservoir penetrated by one or more wells, (b) a reservoir hydraulically fractured through the well, (c) a reservoir being stimulated using acid based stimulation fluid, or (d) a hydrocarbon reservoir being flooded with chemicals for improved oil recovery.

A method of tracing a flow of fluid from a hydrocarbon reservoir can comprise the steps of (a) providing an oil field chemical delivery fluid comprising a base fluid and microcapsules having an outer surface, where the microcapsules comprise a microencapsulant and an oil field chemical contained within the microcapsules, where the outer surface of the microcapsules comprises one or more chemical groups that interact with the base fluid and promote the dispersibility of the microcapsules in the base fluid, and the microcapsules comprise one releasable tracer, (b) injecting the oil field chemical delivery fluid within a well penetrating the reservoir, (c) contacting the oil field chemical delivery fluid with a targeted area of the hydrocarbon reservoir, (d) collecting a plurality of samples of fluids flowing from the well over a period of time and (e) analyzing the samples to determine at least one of the absence of the tracer, the presence of the tracer, or the presence and the concentration of the tracer in fluids flowing from the well. The targeted area is preferably (i) within the formation of a well penetrating the reservoir, where the well is formed by drilling and completion, (ii) around and within a fracture in a rock formation forming the reservoir, where the fracture is formed by hydraulic fracturing, (iii) around and within a fracture in a rock formation forming the reservoir, where the fracture is formed by stimulation using acid based stimulation fluid, or (iv) within the formation of the reservoir penetrated by a well, A method of tracing a flow of fluid from a hydrocarbon reservoir comprising the steps of (a) providing an oil field chemical delivery fluid comprising a base fluid and microcapsules having an outer surface, where the microcapsules comprise a microencapsulant and an oil field chemical contained within the microcapsules, where the outer surface of the microcapsules comprises one or more chemical groups that interact with the base fluid and promote the dispersibility of the microcapsules in the base fluid, where the microcapsules of the oil field chemical delivery fluid contain two or more releasable tracers, (b) injecting the oil field chemical delivery fluid within a well penetrating the reservoir, (c) contacting the oil field chemical delivery fluid with a targeted area of the hydrocarbon reservoir, (d) collecting a plurality of samples of fluids flowing from the well over a period of time and (e) analyzing the samples to determine at least one of the absence of the tracer, the presence of the tracer, or the presence and the concentration of the tracer in fluids flowing from the well. The targeted area is preferably (i) within the formation of a well penetrating the reservoir, where the well is formed by drilling and completion, (ii) within a fracture in a rock formation forming the reservoir, where the fracture is formed by hydraulic fracturing, (iii) within a fracture in a rock formation forming the reservoir, where the fracture is formed by stimulation using acid based stimulation fluid, or (iv) within the formation of a well penetrating the reservoir.

A method of tracing a flow of fluid from a hydrocarbon reservoir comprising the steps of (a) preparing two or more oil field chemical delivery fluids where each of the oilfield chemical delivery fluids comprise a base fluid and microcapsules having an outer surface, where the microcapsules comprise a microencapsulant and an oil field chemical contained within the microcapsules, where the outer surface of the microcapsules comprises one or more chemical groups that interact with the base fluid and promote the dispersibility of the microcapsules in the base fluid, where the microcapsules in each of the oil field chemical delivery fluids contains one or more releasable tracers, (b) injecting separately the oil field chemical delivery fluids within a well penetrating the reservoir separately, (c) contacting the oil field chemical delivery fluids with targeted areas of the hydrocarbon reservoir, (c) collecting a plurality of samples of fluids flowing from the well over a period of time and (d) analyzing the samples to determine at least one of the absence of the tracer, the presence of the tracer, or the presence and the concentration of the tracer in fluids flowing from the well. The targeted areas are preferably: (i) within the formation of a well penetrating the reservoir, where the well is formed by drilling and completion, (ii) within a fracture in a rock formation forming the reservoir, where the fracture is formed by hydraulic fracturing, (iii) within a fracture in a rock formation forming the reservoir, where the fracture is formed by stimulation using acid based stimulation fluid, or (iv) within the formation of a well penetrating the reservoir.

One particularly useful application of this invention is for detecting oil generation and flow in hydraulic fracturing operations. For example, designed microcapsules containing tracers can be formulated into a fracking fluid and injected downhole (e.g., at the same time with the proppants is added). The tracers can be placed into different stages of the system. For example, an oil soluble tracer can be injected into a first stage, with a different tracer (either oil or water soluble) injected into a second stage. In a stage, two or more tracers in microcapsules having different densities can be injected in the same fluid, with one tracer within microcapsules having a greater density than the base fluid and another tracer within microcapsules have a density less than the base fluid. The microcapsules having a density greater than the base fluid will be targeted to areas below the horizontal line of the well and the microcapsules having a density less than the base fluid will be targeted to areas above the horizontal line of the well.

In order to identify hydrocarbons flowing from a particular fracturing operation, it is important that a tracer is introduced into the well in such a way that it can penetrate the formation at the location of an induced fracture. The oil field chemical delivery fluid comprising a microcapsule comprising a tracer is preferably added to the fracturing fluids introduced into the well after the initial injection of fracture fluid creating the initial rock fracture matrix. Preferably the oil field chemical delivery fluid is added during the initial injection of solid proppant particles, such as sand or ceramic proppant, during each stage, at the front of the solids injection in order that it will enter deep into the formation and will contact hydrocarbon if present. For this purpose, the fracturing fluid is used a base fluid and microcapsules comprising tracers are formulated into the hydraulic fracturing fluid, and the solid proppant is then added to result the final oil field chemical delivery fluid. It is preferred that the oil field chemical delivery fluid is consistently injected at the same point during each hydraulic stimulation stage. It is also preferred that the oil field chemical delivery fluid comprising microcapsules comprising tracers are not injected towards the end of the stage because in that case it can be very close to the well bore and can flow back to surface whether or not it has contacted hydrocarbon.

A typical hydraulic fracturing operation in an oil or gas well is carried out in stages, many using between 10 and 40 stages per well. An oil field chemical delivery fluid comprising a microcapsule comprising a tracer can be added to each stage or only to some of the stages. The tracer used in each oil field chemical delivery fluid is preferably unique, in that it preferably has a different tracer characteristic from each other tracer compound used in the fracturing operation so that hydrocarbon flows produced from each stage can be identified. The tracer characteristic is usually the chemical identity of the tracer compound used. The tracer characteristic must be distinguishable from the tracer characteristic(s) of any other tracer compounds used.

Following completion of the fracture work, the well is prepared for back flow. During the back flowing of the well, reservoir oil/gas samples are taken on a regular basis, typically for the first 10 to 40 days. The samples are analyzed using appropriate methods to detect the presence and concentration of the tracer. The method of analyzing the sample is selected to be useful to identify and, preferably, to provide a measure of concentration of the tracer in the fluid sample. Suitable methods include chromatography; particularly gas chromatography (GC) coupled with appropriate detection means. Spectroscopy or electrochemical analysis methods can also be used. Of particular use for identifying and measuring the concentration of halogenated aromatic compounds is gas chromatography coupled with mass spectrometry allowing detection sensitivities to low parts per billion to be achievable.

The completion work can involve the plugging of a section of a well to prevent flow of fluid. This can be undertaken to block or control the flow of reservoir fluids from a certain part of the well, e.g. from the toe of the well to towards the heel or surface. It can be useful to block the flow of fracturing fluid at a particular location in the well in order to fracture a particular part of the reservoir. The flow can be blocked, or restricted, e.g. as to direction or flow rate, by means of a barrier which can be in the form of a plug or a well completion device, such as a screen, having at least one flow control means comprising at least one hole and which, in a first condition allows flow through said hole and in a second condition blocks flow through said hole. Such devices can be operated to enable or block flow by means of a tool or by pressure built up in the well at the location of the barrier. Such devices are available as sliding sleeve arrangements for example. When the barrier is a plug, for example filled with cement, the plug can be drilled out in order to enable flow of fluid past the location of the plug. Operating a completion device to enable flow of fluid or drilling out a plug can be referred to as "releasing" the plug or barrier. In a typical well completion operation many such barriers to flow can be installed as the well is completed in stages. In a typical operation, each barrier can be associated with at least one reservoir fracturing operation. Each fracturing operation is therefore conveniently associated with a particular tracer compound which is different from tracer compounds used in other fracturing operations in the well. When the method of the invention is used during a fracturing operation and a barrier, which has been placed downstream of the fracturing operation (for example to enable fracturing of another fracturing operation downstream of the first (upstream) fracturing operation), is released or removed, then the detection in a sample collected downstream of the barrier location (e.g. at the well-head) of the tracer placed with the upstream fracturing operation confirms to the completion operator that the barrier has been released properly and that hydrocarbon fluid has flowed from the reservoir at the upstream fracture past the location of the barrier.

It is preferred to record the amount of hydrocarbon produced by the well over particular time periods during the period of taking samples for tracer analysis. In a particularly preferred method, concentration versus time curves are created for each tracer. Integration of each curve over a specific period of time during flow back is carried out to provide a profile of production from each fracture stage of the well. A comparison of tracer flow back to surface versus the amount of tracer emulsion injected at the surface can be carried out versus time. The recovery of each tracer can be compared using a normalization process to determine the relative contribution of each stage over a specified time period. This relative flow data is used to determine relative flow from each hydraulic stimulation stage to surface versus time.

Further, for each stage of the hydraulic fractured reservoir, the contribution of production flow from areas above and below the horizontal plane of the well can also be measured using a similar method. For performing this calculation, two different tracers can be injected to each stage. One tracer within microcapsules having a density greater than that of the base fluid and the other tracer is within microcapsules having a density lower than that of base fluid, so that the two tracers are delivered to the same stage but to areas above and below the horizontal plane of the well, respectively. The return of the two tracers can be quantified and compared to amounts injected to give an indication of the production contribution from the areas above and below the horizontal planes.

A method provided by this invention can be used to identify a flow of a hydrocarbon fluid from a first location in a subterranean reservoir to a well located at a second location in the reservoir by: a) providing an oil field delivery fluid comprising a microcapsule comprising at least one hydrocarbon-soluble tracer compound in an aqueous base liquid, b) injecting the oil field chemical delivery fluid from step a) down a well penetrating a hydrocarbon reservoir at the first location, c) thereafter collecting a sample of hydrocarbon fluid flowing from the well located at the second location, d) analyzing the sample to determine whether the tracer compound is present in the sample and e) determining, from the results of the analysis, whether a flow of hydrocarbon has occurred from the first location to the second location.

A method provided by this invention can be used to confirm the presence at a first location in a well of a barrier which would, if present, restrict flow of a hydrocarbon fluid from a location in a well upstream of the first location to a location downstream of the first location. The method comprises the steps of: (a) providing an oil field delivery fluid comprising a microcapsule comprising at least one hydrocarbon-soluble tracer compound, (b) injecting the oil field delivery fluid down a well penetrating a hydrocarbon reservoir at the location upstream of the first location, (c) thereafter collecting a sample of hydrocarbon fluid flowing from the reservoir at a location downstream of the first location, and (d) analyzing the sample to determine a presence or an absence of the tracer compound in the sample. The method can further comprise the step of (e) inferring from the presence or absence of tracer compound in the sample whether said sample contains hydrocarbon which has flowed from said location upstream of said first location, thereby to determine whether said barrier exists at said first location.

EXAMPLES

Example 1

Microencapsulation of an Oil Soluble Tracer

A solid tracer (Tracer A, a haloaromatic compound, density 2.4 g/cm$^3$) was ground and filtered through a 100 μm sieve. 1.2 g carboxylmethylcellulose sodium salt (Sigma) was dissolved in 78.3 g water and then mixed with 15.9 g Beetle resin (BIP) and 0.35 g formic acid (96%, Sigma) to form an aqueous mixture. The aqueous mixture was stirred at 25° C. for 1 hour. 60 g of the sieved tracer and the aqueous mixture were then homogenised together for 5 minutes using a Silverson L4R laboratory homogeniser. During homogenisation, 300 g water was added to dilute the mixture. The homogenised mixture was stirred at 25° C. for 2 hours and then at 65° C. for 2 more hours. The resultant dispersion was filtered, dried in air for 3 days and then dried in a vacuum oven at 50° C. for 8 hours. The dried powder product containing the encapsulated tracer was filtered through a 425 μm sieve.

Example 2

Release of Dry Microencapsulated Tracer into Synthetic Oil

Microencapsulated tracer from Example 1 (0.16 g, weight equivalent to 0.135 g tracer) was placed in 18 g of a synthetic oil (80% Transulate transformer oil (Smith & Allan) and 20% Downtherm Q oil (Dow Chemical)) at 60° C. and stirred. Samples of the synthetic oil were taken at various times and analysed to determine the percent of the applied amount of tracer released into the synthetic oil. The release of the tracer from the microcapsules was recorded over time, with about 50% of the tracer released by about four to five hours and about 70% of the tracer released by about 6 hours (FIG. 2). Samples taken after 21 hours found that all of the tracer had been released into the oil.

Example 3

Microencapsulation of an Oil Soluble Tracer

Solid tracer A (a haloaromatic compound) was ground and filtered through 100 μm sieve. 0.48 g carboxylmethylcellulose sodium salt (Sigma) was dissolved in 78.3 g water and then mixed with 6.36 g Beetle resin (BIP) and 0.14 g formic acid (96%, Sigma) to form an aqueous mixture. The aqueous mixture was stirred at 25° C. for 1 hour. 60 g of the sieved tracer and the aqueous mixture were then homogenised together for 5 minutes using a Silverson L4R laboratory homogeniser. During homogenisation, 200 g water was added to dilute the mixture. The homogenised mixture was stirred at 25° C. for 2 hours and then at 65° C. for 2 more hours. The resultant dispersion was filtered, dried in the air for 3 days and then dried in a vacuum oven at 50° C. for 8 hours. The dried powder product containing the encapsulated tracer was filtered through a 425 μm sieve. The tracer content of the dried powder was 85% by weight.

Example 4

Formulation of a Model Slick Water

Slick water is a type of fracturing fluid that contains friction reducers, such as a polyacrylamide. A model slick water was made by dissolving 0.20 g poly(acrylamide-co-acrylic acid) partial sodium salt ($M_w$: 520000, ~wt. 80% Acrylamide, Aldrich), 0.15 g 1-butanol (99.8%, Sigma) and 0.15 g ethylene glycol butyl ether (≥99%, Sigma) in 200 g deionised water.

Example 5

Interaction of Microencapsulated Tracer with Crude Oil Containing Formation and Transfer of Tracer from Oil Field Chemical Delivery Fluid to Crude Oil Containing Formation A sample of crude oil containing a subterranean formation taken at a horizontal well (3250 meter below the surface) at a South American oil field was used to observe the interaction between the microencapsulated tracers and crude oil and to test the release properties of the microencapsulated tracer.

In a glass vial, 0.0525 g microencapsulated tracer of Example 3 was dispersed in 50 g slick water (Example 4), at room temperature and a turbid dispersion was obtained. 25.3 g crude oil containing formation sample described above was added to the turbid dispersion. The mixture was shaken for 30 seconds and the oil containing formation was temporarily suspended in the turbid dispersion. As soon as the shaking stopped, the oil containing formation separated from the dispersion and settled to the bottom of the glass vial. After standing at room temperature for two hours without agitation, the mixture became clear.

A dispersion of microencapsulated capsules in slick water was left to stand for 5 hours at room temperature as a control. This sample remained turbid.

The samples were analysed to determine the concentrations of the tracer in various components. The supernatant in the oil containing formation was decanted. The decanted water (42.5 g) was extracted with 53.4 g toluene and analysed following similar procedures. The concentration of tracer in the toluene solution was found to be 27.2 ppm.

The oil formation and remaining water at the bottom of the bottle was mixed with 84.5 g toluene. The mixture was placed in an oven at 60° C. for 2 hours and shaken occasionally, then cooled to room temperature and filtered. 95 g crude oil/toluene solution was obtained. Analysis of the crude oil/toluene solution samples by gas chromatography (GC) showed the concentration of tracer in this solution was 431.7 ppm.

Based on the amount of microcapsules used (0.0525 g), the maximum concentration of tracer in 95 g toluene was expected to be 470 ppm. The measured tracer concentration of 431.7 ppm indicated that more than 90% of microencapsulated tracer had been deposited to the oil formation in 2 hours at room temperature.

Example 6

Microencapsulation of a Solution of an Oil Soluble Tracer Having a Density Less than Water 15 g of the tracer used in Example 1 (a haloaromatic compound) was dissolved in 85 g organic solvent (a cyclic terpene). 2.5 g carboxylmethylcellulose sodium salt (Sigma) was dissolved in 120 g water and then mixed with 26.5 g Beetle resin (BIP) and 0.58 g formic acid (96%, Sigma) to form an aqueous mixture. The aqueous mixture was stirred at 25° C. for 1 hour. The solution of the tracer and the aqueous mixture were homogenised together for 5 minutes using a Silverson L4R laboratory homogeniser. During homogenisation, 300 g water was added to dilute the mixture. The homogenised mixture was stirred at 25° C. for 2 hours and then at 65° C. for 2 more hours. The resultant dispersion was filtered and kept as a wet filter cake. The average solid content of the filter cake was 29% (26-32%). The density of the microcapsule was less than that of water as indicated by the microcapsules moving slowly (over 7 days) to a layer above the water after being mixed in water.

Example 7

Microencapsulation of a Solution of an Oil Soluble Tracer Having a Density Greater than Water 22.5 g of the tracer used in Example 1 was dissolved in 77.5 g of the same organic solvent used in Example 6. 2.5 g carboxylmethylcellulose sodium salt (Sigma) was dissolved in 120 g water and then mixed with 26.5 g Beetle resin (BIP) and 0.58 g formic acid (96%, Sigma) to forma an aqueous mixture. The aqueous mixture was stirred at 25° C. for 1 hour. The solution of the tracer and the aqueous mixture were then homogenised together for 5 minutes using a Silverson L4R laboratory homogeniser. During homogenisation, 300 g water was added to dilute the mixture. The homogenised mixture was stirred at 25° C. for 2 hours and then at 65° C. for 2 more hours. The resultant dispersion was filtered and kept as wet filter cake. The average solid content of the filter cake was 29% (26-32%). The density of the microcapsule was greater than that of water as indicated by the slow settling of the microcapsules over 10 days after being mixed in water.

Example 8

Microencapsulation of a Solution of an Oil Soluble Tracer Having a Density Approximately the Same as Water 20 g of the tracer used in Example 1 was dissolved in 80 g of the same organic solvent used in Example 6. 2.5 g carboxylmethylcellulose sodium salt (Sigma) was dissolved in 120 g water and then mixed with 26.5 g Beetle resin (BIP) and 0.58 g formic acid (96%, Sigma) to forma an aqueous mixture. The aqueous mixture was stirred at 25° C. for 1 hour. The solution of the tracer and the aqueous mixture were then homogenised together for 5 minutes using a Silverson L4R laboratory homogeniser. During homogenisation, 300 g water was added to dilute the mixture. The homogenised mixture was stirred at 25° C. for 2 hours and then at 65° C. for 2 more hours. The resultant dispersion was filtered and kept as wet filter cake. The average solid content of the filter cake was 29% (26-32%). The density of the microcapsule was about the same as that of water as indicated by the microcapsules remaining dispersed throughout the water when mixed with water.

Example 9

Figure 3:
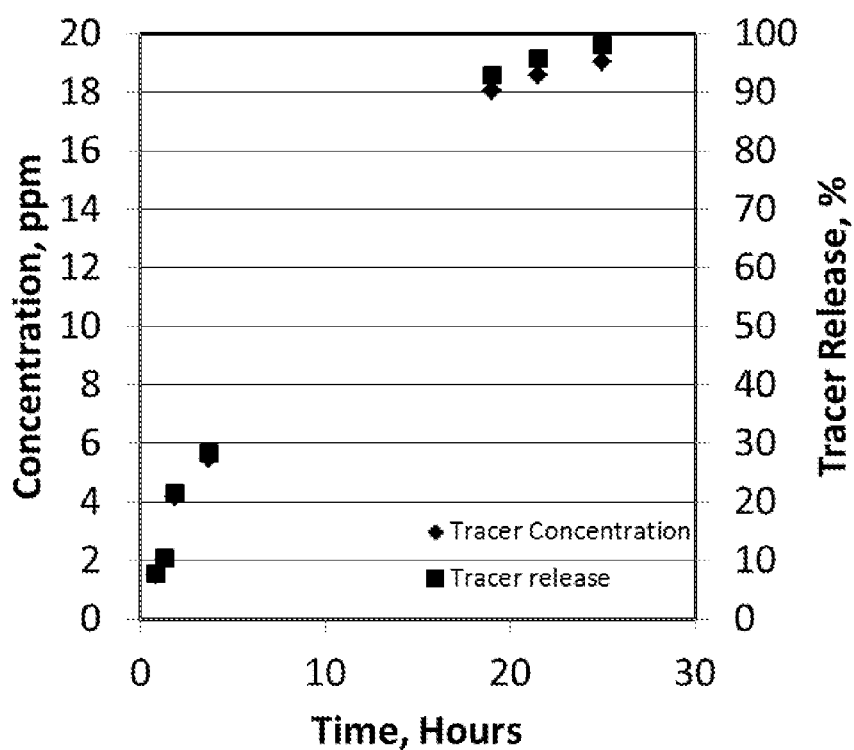
FIG. 3 is a graphical representation of the release of a tracer from microencapsulated capsules in dispersion to synthetic oil.

Release of Oil Soluble Tracer from Microcapsule Dispersion to Synthetic Oil 0.0245 g wet microcapsule cake made in Example 7 was dispersed in 50.7 g slick water prepared in Example 4, mixed with 51.5 g synthetic oil (described in Example 2) and placed in an oven at 60° C. The mixture was left in the oven without agitation. Samples of the synthetic oil were taken at various times, the concentration of tracer in the synthetic oil was measured by GC and the percentage of tracer released was calculated. More than 95% of the applied tracer was released within 22 hours. (FIG. 3)

Example 10

Comparison of Coagulation of Microencapsulated Tracer in Presence of Crude Oil Containing Formulation and Proppants The interaction between microencapsulated particles and crude oil containing formation fluid and a commercial ceramic proppant was compared.

In a glass vial, 0.0636 g wet microcapsule cake made in Example 6 was dispersed into 8 g slick water prepared in Example 4, and then mixed with 5 g crude oil containing formation sample described in Example 5.

In a separate glass vial, 0.0635 g wet microcapsule cake made in Example 6 was dispersed into 8 g slick water prepared in Example 4, and then mixed with 5 g commercial ceramic proppant.

Both vials were placed in an oven at 60° C. After 24 hours, the dispersion in the vial containing proppant remained very turbid, with tracer microcapsules floating. However, in the vial containing the oil formation, the liquid became quite clear with many of the microcapsules appearing to have coagulated and accumulated at or around the oil formations. The particles remained without being degraded or dissolved.

The supernatant in the crude oil formation vial was decanted. The top water and the oil formation were mixed with 11.6074 g and 16.0175 g toluene, respectively. After extracting the water, the toluene remained colourless and the tracer concentration in the toluene was 0.15 ppm. After extracting the oil formation, a black solution of crude oil/toluene was obtained and the tracer concentration in this solution was found to be 141.59 ppm. The tracer was predominantly present in the settled oil formation.

Example 11

Release of Tracer Oil Soluble Tracer from Microcapsule Dispersion to Crude Oils In four glass vials, 0.0191, 0.0205, 0.0203 and 0.0176 g of wet microcapsule cake made in Example 6 was dispersed into 9.1236, 10.1321, 8.02 and 9.0494 g slick water prepared in Example 4, respectively. To the first vial, 2.9121 g synthetic oil described in Example 2 was added. To the other three vials, crude oil from oil fields in different parts of the world (Mid East, Central Asia and South America) was added. The amount of crude oil used was 2.6157, 1.7653 and 4.4050 g, respectively. All the vials were placed in an oven at 60° C. After 5 hours and 21 hours in the oven at 60° C., the samples were evaluated. The microencapsulated tracer particles were coagulated in each of the vials with crude oil. The tracer concentrations in the synthetic and crude oils were measured after 21 hours. The measured concentration of tracer was 241.3 ppm in the synthetic oil and 250.4, 460.9, 122.5 ppm in the crude oils, respectively. The maximum tracer concentrations in these oils to be expected were 260, 310, 461 and 153 ppm respectively. Between 80-100% of tracer was released into the oils in 21 hours.

Example 12

Microencapsulation of a Biocide

An anthraquinone type biocide was encapsulated using the following procedure. 1.2 g carboxylmethylcellulose sodium salt (Sigma) was dissolved in 78.3 g water and then mixed with 15.9 g Beetle resin (BIP) and 0.35 g formic acid (96%, Sigma) to form a mixture. The aqueous mixture was stirred at 25° C. for 1 hour. 60 g of the biocide and the aqueous mixture was then homogenised together for 5 minutes using a Silverson L4R laboratory homogeniser. During homogenisation, 300 g water was added to dilute the mixture. The homogenised mixture was stirred at 25° C. for 2 hours and then at 65° C. for 2 more hours. The resultant dispersion was filtered, dried in air for 3 days and then dried in a vacuum oven at 50° C. for 8 hours. The dried powder product containing the encapsulated tracer was filtered through a 425 μm sieve.

Example 13

Interaction of Microencapsulated Tracer with Crude Oil Containing Formation and Transfer of Tracer In a glass vial, 0.05 g microencapsulated tracer made in Example 3 was dispersed in 50 g deionised water at room temperature. A turbid dispersion was obtained. 25 g crude oil containing formation sample described in Example 5 was added to the turbid dispersion. The mixture was shaken for 30 seconds so that the oil containing formation was temporarily suspended in the turbid dispersion. As soon as the shaking was stopped, the oil containing formation separated from the dispersion and settled to the bottom of the glass vial. After standing for 2 hours without agitation at room temperature, the mixture became clear. A white coloured layer of microcapsules covering the dark coloured crude oil containing formation was observed.

A pure dispersion of microencapsulated capsules in deionised water, used as a control, remained turbid after being left to stand for 5 hours at room temperature.

Example 14

Interaction of Microencapsulated Tracer with Crude Oil Containing Formation and Transfer of Tracer In a glass vial, 0.05 g microencapsulated tracer made in Example 6 was dispersed in 50 g deionised water at room temperature. A turbid dispersion was obtained. 25 g crude oil containing formation sample described in Example 5 above was added to the turbid dispersion. The mixture was shaken for 30 seconds to temporarily suspend the oil containing formation in the turbid dispersion. As soon as the shaking was stopped, the oil containing formation was separated from the dispersion and settled to the bottom of the glass vial. The mixture was placed in a 60° C. oven. After standing for 24 hours without agitation at room temperature, the mixture became clear. A white coloured layer of microcapsules covering the dark coloured crude oil containing formation was observed.

A dispersion of microencapsulated capsules in deionised water, a control sample, remained turbid after standing for 24 hours at 60° C.

Comparative Example 1

Failed Attempt to Disperse Solid Tracer A in Slick Water

Solid tracer A was ground and filtered through a 100 μm sieve. In a glass vial, 0.05 g of the ground tracer was added at room temperature to 50 g slick water made in Example 4. Attempts to disperse the tracer in the slick water by mechanical force (e.g. stirring with a stainless steel spatula) failed. At low shearing or mechanical force, the very hydrophobic tracer powders formed a big lump (with air bubbles inside) and remained floating on top of the slick water. Under high shear or high mechanical force (e.g. stirring using an electromagnetic stirrer), the powders were forced into the water, but settled to the bottom of the vial as soon as the shearing or mechanical force stopped.

Comparative Example 2

Failed Attempt to Disperse a Solution of Tracer A in an Organic Solvent in Slick Water 15 g of the tracer A was dissolved in 85 g organic solvent (a cyclic terpene) to form a tracer solution. In a glass vial, 0.2 g of the tracer solution was added at room temperature to 50 g slick water made in Example 4. Attempts to disperse the tracer in the slick water by mechanical force (e.g. stirring with a stainless steel spatula) failed. Under shear or mechanical force (e.g. stirring using an electromagnetic stirrer), the tracer solution formed droplets in the water with droplet size of about ~2 mm. However, the droplets joined together and floated to the top of the slick water as soon as the shearing or mechanical force was stopped.

Comparative Example 3

Failed Attempt to Disperse a Solution of Tracer A in an Organic Solvent in Slick Water 20 g of the tracer A was dissolved in 80 g organic solvent (a cyclic terpene) to form a tracer solution. In a glass vial, 0.2 g of the tracer solution was added at room temperature to 50 g slick water made in Example 4. Attempts to disperse the tracer in the slick water by mechanical force (e.g. stirring with a stainless steel spatula) failed. Under shear or mechanical force (e.g. stirring using an electromagnetic stirrer), the tracer solution formed droplets in the water with droplet size of about ~2 mm. However, the droplets coalesced as soon as the shearing or mechanical force was stopped. The tracer solution tended to float to the top of the slick water.

Comparative Example 4

Failed Attempt to Disperse a Solution of Tracer A in an Organic Solvent in Slick Water 22 g of the tracer A was dissolved in 78 g organic solvent (a cyclic terpene) to form a tracer solution. In a glass vial, 0.2 g of the tracer solution was added at room temperature to 50 g slick water made in Example 4. Attempts to disperse the tracer in the slick water by mechanical force (e.g. stirring with a stainless steel spatula) failed. Under shear or mechanical force (e.g. stirring using an electromagnetic stirrer), the tracer solution formed droplets in the water with droplet size of about ~2 mm. However the droplets coalesced as soon as the shear or mechanical force stopped.

Although the invention is illustrated and described herein with reference to specific aspects of the invention, the invention is not intended to be limited to the details shown. Rather, various modifications can be made in the details within the scope and range of equivalents of the claims and without departing from the invention.

What is claimed is:

1. A method of tracing a flow of fluid from a hydrocarbon reservoir comprising:
    injecting within a well penetrating a reservoir an oil field chemical delivery fluid comprising a base fluid and microcapsules having an outer surface, wherein the microcapsules comprise a polymeric microencapsulant and an oil-soluble oil field chemical contained within the microcapsules,
    wherein the base fluid is a water-based fluid, and wherein the outer surface of the microcapsules comprises (a) one or more hydrophilic chemical groups that interact with the water-based fluid and promote the dispersibility of the microcapsules in the water-based fluid, and (b) one or more hydrophobic chemical groups that (i) interact with targeted areas of a hydrocarbon reservoir penetrated by a well, the targeted areas being crude oil containing formations, and (ii) promote substantivity of the microcapsules to the crude oil containing formations of the hydrocarbon reservoir wherein the tendency of the microcapsules to deposit or accumulate at or on the crude oil containing formations is increased leading to adsorption of the microcapsules on the oil containing formations as a result of the one or more hydrophobic chemical groups on the outer surface of the microcapsules, wherein the oil-soluble oil field chemical is a tracer, wherein the microcapsules have an average particle size of between 0.1 μm and 500 μm, inclusive; and
    analysing a sample of a fluid from the well to determine the presence or absence of the oil-soluble tracer.

2. The method of claim 1, wherein the microcapsules comprise at least one of the following structures:
    (a) a core shell structure comprising (i) a core comprising the oil-soluble oil field chemical and (ii) a shell comprising the polymeric microencapsulant;
    (b) a core multi-shell structure comprising (i) a core comprising the oil-soluble oil field chemical, (ii) a first shell comprising the polymeric microencapsulant located adjacent to the core; and (iii) one or more additional shells located over the first shell, each additional shell comprising an additional polymeric microencapsulant that is different than the polymeric microencapsulant in an adjacent shell;
    (c) a multi-core shell structure comprising (i) a core comprising a plurality of sub-cores, where each sub-core comprises the oil-soluble oil field chemical, and the sub-cores are dispersed in a non-polymeric compound, and (ii) a shell comprising the polymeric microencapsulant;
    (d) a micro-matrix structure comprising a core comprising the oil-soluble oil field chemical entrapped within a micro-matrix comprising the polymeric microencapsulant;
    (e) a micro-matrix with shell structure comprising (i) a core comprising the oil-soluble oil field chemical entrapped within a micro-matrix comprising the polymeric microencapsulant; and (ii) a shell comprising a further polymeric microencapsulant; and
    (f) a multi-core-micro-matrix with shell structure comprising (i) a micro-matrix comprising a plurality of sub-cores, where each sub-core comprises the oil-soluble oil field chemical, and the sub-cores are entrapped within the micro-matrix, and (ii) a shell comprising the polymeric microencapsulant.

3. The method of claim 1, wherein the oil field chemical delivery fluid comprise a first group of microcapsules comprising oil field chemicals having a first density and a second group of microcapsules comprising oil field chemicals having a second density, wherein at least one of the oil field chemicals is the oil-soluble oil field chemical.

4. The method of claim 1, where the oil field chemical delivery fluid comprises at least two oil field chemicals and at least one of the oil field chemicals is the oil-soluble oil field chemical encapsulated within the microcapsules.

5. The method of claim 1, where the water-based base fluid comprises deionised water, produced water, sea water, brine water, or a water-based well treatment fluid.

6. The method of claim 5, where the water-based base fluid comprises the water-based well treatment fluid and the water-based well treatment fluid is an acid based well stimulation fluid, a hydraulic fracturing fluid, a chemical flooding fluid used for improved oil recovery or scale inhibition fluid, a corrosion inhibition fluid, a wax control fluid, a gas hydrate control fluid, an antimicrobial fluid, a hydrogen sulfide scavenger fluid or an oxygen scavenger fluid.

7. The method of claim 1, where the microencapsulant is
    a polymer selected from the group consisting of a melamine-formaldehyde, a urea-formaldehyde, a phenol-formaldehyde resin, a melamine-phenol-formaldehyde resin, a furan-formaldehyde resin, an epoxy resin, a polysiloxane, a polyacrylate, a polyester, a polyurethane, a polyamide, a polyether, a polyimide, a polyolefin, polypropylene-polyethylene copolymers, polystyrene, functionalized polystyrene derivatives, gelatin, a gelatin derivative, cellulose, a cellulose derivative, starch or a starch derivative, a polyvinyl alcohol, an ethylene-vinylacetate copolymer, a maleic-anhydride based copolymer, a polyacrylamide, a polyacrylamide based copolymer, a polyacrylic acid, a polyacrylic acid based copolymer, a polyvinylpyrrolidone, a polyvinylpyrrolidone based copolymer, a polyacrylate based copolymer, a polyacrylamide, a polyacrylamide based copolymer, propylene-acrylate copolymer, propylene-methacrylate copolymers, oxidised polypropylene, oxidised polyethylene, propylene-ethylene oxide copolymers, styrene-acrylate copolymers and acrylonitrile-butadiene-styrene copolymers, a Pickering stabilizer, and mixtures thereof.

8. The method of claim 7, wherein:
(a) the polymer comprises a cellulose derivative, the cellulose derivative being cellulose sodium carboxyl methylcellulose, hydroxylmethylcellulose, or hydroxylpropylcellulose,
(b) the polymer comprises a maleic-anhydride based copolymer, the maleic-anhydride based copolymer being an ethylene-maleic-anhydride copolymer, a styrene-maleic anhydride copolymer, a vinyl acetate-maleic anhydride copolymer, a vinyl ether-maleic anhydride copolymer, a methyl vinyl ether maleic anhydride copolymer or an octadecyl vinyl ether-maleic anhydride copolymer,
(c) the polymer comprises a Pickering stabilizer, the Pickering stabilizer being nano calcium carbonate or nano silicon dioxide, or any combination of (a), (b), and (c).

9. The method of claim 1, where the oil-soluble oil field chemical is present in the microcapsule at 5 to 99.5% by weight of the microcapsule.

10. The method of claim 1, wherein the one or more hydrophilic groups that interact with the water-based fluid are selected from the group consisting of: a carboxylate, a sulphonate, an alkyl sulphate, an aryl sulphate, an amine, an alkylated amine, an anhydride, a carbonyl, an acetyl, a hydroxyl, a phosphate, a sulfate, a nitrile, a nitro, a thiol, an aldehyde, a quaternized amine, an N-alkylamide, an N-methylol, a silanol, a pyrrolidonyl, a pyridine, a pyrimidine, a triazine linkage, an ethylene linkage, a styrenic linkage, a propylene linkage, and a glucose unit.

11. The method of claim 1, wherein the one or more hydrophobic groups are selected from the group consisting of: an urea linkage, a biuret linkage, a triazine linkage, an ethylene linkage, a styrenic linkage, a propylene linkage, or a glucose unit, a carboxylate, a sulphonate, an alkyl sulphate, an aryl sulphate, an amine, an alkylated amine, an anhydride, a carbonyl, an acetyl, a hydroxyl, an isocyanate, a phosphate, a sulfate, a nitrile, a nitro, a thiol, an aldehyde, a quaternized amine, an N-alkylamide, an N-methylol, a silanol, a pyrrolidonyl, a pyridinyl and a pyrimidinyl.

* * * * *